(12) United States Patent
Gritti

(10) Patent No.: US 11,898,999 B2
(45) Date of Patent: Feb. 13, 2024

(54) MIXER FOR LIQUID CHROMATOGRAPHY

(71) Applicant: Waters Technologies Corporation, Milford, MA (US)

(72) Inventor: Fabrice Gritti, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 0 days.

(21) Appl. No.: 17/358,360

(22) Filed: Jun. 25, 2021

(65) Prior Publication Data

US 2022/0011278 A1    Jan. 13, 2022

Related U.S. Application Data

(60) Provisional application No. 63/048,684, filed on Jul. 7, 2020.

(51) Int. Cl.
| | |
|---|---|
| *G01N 30/34* | (2006.01) |
| *G01N 30/38* | (2006.01) |
| *G01N 30/02* | (2006.01) |

(52) U.S. Cl.
CPC ............ *G01N 30/34* (2013.01); *G01N 30/38* (2013.01); *G01N 2030/027* (2013.01); *G01N 2030/347* (2013.01)

(58) Field of Classification Search
CPC ............ B01F 25/431; B01F 2035/3511; B01F 25/431971; B01F 25/432; B01F 25/4416;
(Continued)

(56) References Cited

U.S. PATENT DOCUMENTS

| 3,595,531 A | 7/1971 | Williams et al. |
| 3,830,369 A | 8/1974 | Pfadenhauer |

(Continued)

FOREIGN PATENT DOCUMENTS

| CN | 203061073 U | 7/2013 |
| CN | 203385703 U | 1/2014 |

(Continued)

OTHER PUBLICATIONS

International Search Report and Written Opinion in PCT/US2021/039058 dated Oct. 14, 2021.
(Continued)

*Primary Examiner* — Harshad R Patel
*Assistant Examiner* — Gedeon M Kidanu
(74) *Attorney, Agent, or Firm* — Schmeiser, Olsen & Watts LLP; William G. Guerin

(57) ABSTRACT

Described is a mixer for a liquid chromatography system. The mixer includes a flow distributor, a mixing disk and a flow collector. The mixer includes an inlet face, an outlet face and a plurality of channels each having an inlet end at the inlet face and an outlet end at the outlet face. The channels have a flow direction anisotropy between the inlet and outlet faces. A compositional solvent stream received at the flow distributor is distributed across the inlet face of the mixing disk and the flow collector collects the distributed solvent composition stream after passing through the mixing disk. The mixing disk may include a dispersive medium having a random porous structure. A retention time distribution of the mixer may depend on the structure of the channels between the inlet and outlet faces of the mixing disk.

25 Claims, 16 Drawing Sheets

(58) Field of Classification Search
CPC .......... B01F 25/45211; B01F 25/45231; B01F 33/30; B01F 35/40; B01D 15/12; B29C 2948/92514; B29C 2948/92609; B29C 2948/92704; B29C 48/001; B29C 48/0017; B29C 48/06; B29C 48/22; B29C 48/693; B29C 48/92; B81C 1/00; G01N 2030/347; G01N 30/16; G01N 30/24; G01N 30/34; G01N 30/38; G01N 2030/027

See application file for complete search history.

(56) References Cited

U.S. PATENT DOCUMENTS

| | | | |
|---|---|---|---|
| 4,311,586 A | 1/1982 | Baldwin et al. |
| 4,437,812 A | 3/1984 | Abu-Shumays et al. |
| 4,475,821 A | 10/1984 | Koch et al. |
| 4,496,245 A | 1/1985 | Conrad et al. |
| 4,506,987 A | 3/1985 | Daughton et al. |
| 4,534,659 A | 8/1985 | Dourdeville et al. |
| 4,842,730 A | 6/1989 | James et al. |
| 4,882,062 A | 11/1989 | Moeller et al. |
| 4,882,063 A | 11/1989 | Allington et al. |
| 4,954,253 A | 9/1990 | Alexandrov et al. |
| 5,275,723 A | 1/1994 | Greenley et al. |
| 5,423,661 A | 6/1995 | Gabeler et al. |
| 5,656,034 A | 8/1997 | Kochersperger et al. |
| 5,664,938 A | 9/1997 | Yang |
| 5,738,783 A | 4/1998 | Shirota et al. |
| 5,846,411 A | 12/1998 | Harter et al. |
| 5,887,977 A | 3/1999 | Morikawa |
| 5,904,424 A | 5/1999 | Schwesinger et al. |
| 5,918,976 A | 7/1999 | Hashimoto et al. |
| 6,048,496 A | 4/2000 | Zhou et al. |
| 6,116,869 A | 9/2000 | Couillard et al. |
| 6,170,981 B1 | 1/2001 | Regnier et al. |
| 6,190,034 B1 | 2/2001 | Nielsen et al. |
| 6,319,469 B1 | 11/2001 | Mian et al. |
| 6,629,775 B2 | 10/2003 | Choikhet et al. |
| 6,705,357 B2 | 3/2004 | Jeon et al. |
| 6,845,787 B2 | 1/2005 | Karp et al. |
| 6,851,846 B2 | 2/2005 | Fujii et al. |
| 6,883,559 B2 | 4/2005 | Jeon et al. |
| 6,887,384 B1 | 5/2005 | Frechet et al. |
| 6,916,113 B2 | 7/2005 | Van de Goor et al. |
| 6,919,046 B2 | 7/2005 | O'Connor et al. |
| 6,942,792 B2 | 9/2005 | Aso |
| 6,958,119 B2 | 10/2005 | Yin et al. |
| 6,981,522 B2 | 1/2006 | O'Connor et al. |
| 6,987,263 B2 | 1/2006 | Hobbs et al. |
| 6,991,729 B2 | 1/2006 | Ikeda et al. |
| 7,048,512 B2 | 5/2006 | Couillard et al. |
| 7,105,304 B1 | 9/2006 | Nikiforov et al. |
| 7,111,501 B2 | 9/2006 | Rocklin et al. |
| 7,112,277 B2 | 9/2006 | Bidlingmeyer et al. |
| 7,147,364 B2 | 12/2006 | Oohashi et al. |
| 7,178,386 B1 | 2/2007 | Gamble et al. |
| 7,204,139 B2 | 4/2007 | Takayama |
| 7,207,345 B2 | 4/2007 | Somerville |
| 7,241,423 B2 | 7/2007 | Golbig et al. |
| 7,278,329 B2 | 10/2007 | Weissgerber et al. |
| 7,314,070 B2 | 1/2008 | Jeon et al. |
| 7,390,121 B2 | 6/2008 | Jahn et al. |
| 7,744,762 B2 | 6/2010 | Lazar |
| 7,887,753 B2 | 2/2011 | Quake et al. |
| 7,976,779 B2 | 7/2011 | Tai et al. |
| 8,329,407 B2 | 12/2012 | Ismagilov et al. |
| 8,511,889 B2 | 8/2013 | Choikhet et al. |
| 8,517,597 B2 | 8/2013 | Shreve et al. |
| 8,622,609 B2 | 1/2014 | Shreve et al. |
| 8,696,193 B2 | 4/2014 | Herbstritt |
| 8,764,279 B2 | 7/2014 | Castro et al. |
| 8,894,274 B2 | 11/2014 | Shreve et al. |
| 8,979,358 B2 | 3/2015 | Wiechers |
| 9,126,164 B2 | 9/2015 | Shreve et al. |
| 9,128,071 B2 | 9/2015 | Tsukada et al. |
| 9,527,010 B2 | 12/2016 | Williams et al. |
| 9,528,968 B2 | 12/2016 | Murphy et al. |
| 9,557,317 B2 | 1/2017 | Ozbal |
| 9,566,537 B2 | 2/2017 | Geng |
| 9,636,646 B2 | 5/2017 | Neerincx et al. |
| 9,645,123 B2 | 5/2017 | Angelosanto et al. |
| 9,679,757 B2 | 6/2017 | Netto et al. |
| 9,766,217 B2 | 9/2017 | Kidal et al. |
| 9,791,107 B2 | 10/2017 | Witt et al. |
| 9,884,266 B2 | 2/2018 | Dauphas et al. |
| 9,945,820 B2 | 4/2018 | Albrecht, Jr. |
| 9,968,894 B2 | 5/2018 | Shreve |
| 9,970,908 B2 | 5/2018 | Yotani et al. |
| 9,987,604 B2 | 6/2018 | Baaske et al. |
| 10,088,459 B2 | 10/2018 | Onoda et al. |
| 10,238,989 B2 | 3/2019 | Luongo et al. |
| 10,247,673 B2 | 4/2019 | Peterman et al. |
| 10,295,512 B2 | 5/2019 | Pohl et al. |
| 10,335,753 B2 | 7/2019 | De Corral et al. |
| 2002/0063060 A1 | 5/2002 | Gascoyne et al. |
| 2003/0077204 A1 | 4/2003 | Seki et al. |
| 2003/0123322 A1 | 7/2003 | Chung et al. |
| 2003/0156952 A1 | 8/2003 | Couillard et al. |
| 2004/0042340 A1 | 3/2004 | Aso |
| 2004/0092033 A1 | 5/2004 | Gustafson et al. |
| 2004/0096867 A1 | 5/2004 | Andersson et al. |
| 2004/0109793 A1 | 6/2004 | McNeely et al. |
| 2005/0118070 A1 | 6/2005 | Griss et al. |
| 2005/0252840 A1 | 11/2005 | Arnold et al. |
| 2006/0011548 A1 | 1/2006 | Yin et al. |
| 2006/0039829 A1 | 2/2006 | Suk et al. |
| 2006/0171864 A1 | 8/2006 | Caze et al. |
| 2006/0273012 A1 | 12/2006 | Dehmer |
| 2006/0280029 A1 | 12/2006 | Garstecki et al. |
| 2006/0285433 A1 | 12/2006 | Yang et al. |
| 2007/0148048 A1 | 6/2007 | Jousse |
| 2009/0142846 A1 | 6/2009 | Crenshaw et al. |
| 2009/0207687 A1 | 8/2009 | Kemperman et al. |
| 2009/0255601 A1 | 10/2009 | Baeuerle et al. |
| 2009/0268548 A1 | 10/2009 | Hartmann et al. |
| 2010/0159573 A1 | 6/2010 | Chung et al. |
| 2010/0189602 A1 | 7/2010 | Baeuerle et al. |
| 2011/0113866 A1 | 5/2011 | Finlay |
| 2011/0192217 A1 | 8/2011 | Choikhet et al. |
| 2012/0309648 A1 | 12/2012 | Tseng et al. |
| 2014/0061133 A1 | 3/2014 | Herman |
| 2014/0230528 A1 | 8/2014 | Wang et al. |
| 2014/0251448 A1 | 9/2014 | Witt et al. |
| 2014/0334251 A1 | 11/2014 | Shreve |
| 2014/0345372 A1 | 11/2014 | Gerhardt et al. |
| 2015/0059451 A1 | 3/2015 | Witt et al. |
| 2016/0161454 A1 | 6/2016 | Jones et al. |
| 2016/0266078 A1* | 9/2016 | Onoda ............... B01F 35/40 |
| 2017/0173496 A1 | 6/2017 | Stone |
| 2017/0333898 A1 | 11/2017 | Saleh et al. |
| 2018/0056252 A1 | 3/2018 | Steele et al. |
| 2018/0088091 A1 | 3/2018 | Cormier et al. |
| 2019/0070571 A1* | 3/2019 | Jackson ............... B01F 33/30 |
| 2019/0070572 A1 | 3/2019 | MacKinnon et al. |
| 2019/0170706 A1 | 6/2019 | Gilar et al. |
| 2019/0265206 A1 | 8/2019 | Tarafder |
| 2019/0337211 A1* | 11/2019 | Kazmer ............... B29C 48/06 |
| 2019/0383777 A1 | 12/2019 | Inoue |
| 2020/0023295 A1 | 1/2020 | Moeller et al. |
| 2020/0025723 A1 | 1/2020 | Gilar et al. |
| 2020/0276728 A1 | 9/2020 | Zeko et al. |
| 2021/0156829 A1 | 5/2021 | Raymond et al. |

FOREIGN PATENT DOCUMENTS

| | | |
|---|---|---|
| CN | 204116295 U | 1/2015 |
| CN | 106166453 A | 11/2016 |
| CN | 106422832 A | 6/2017 |
| CN | 106902662 A | 6/2017 |
| CN | 104076112 B | 9/2018 |
| CN | 109173766 A | 1/2019 |
| CN | 209333548 U | 9/2019 |
| CN | 110394105 A | 11/2019 |

(56) References Cited

FOREIGN PATENT DOCUMENTS

| | | |
|---|---|---|
| DE | 19840026 A1 | 3/1999 |
| DE | 19902697 A1 | 7/2000 |
| DE | 19840026 C2 | 11/2000 |
| DE | 10307507 B4 | 9/2013 |
| DE | 102015100693 A1 | 7/2016 |
| DE | 102018104840 A1 | 4/2018 |
| DE | 102018104842 A1 | 4/2018 |
| EP | 1566215 A2 | 8/2005 |
| EP | 1788388 A1 | 5/2007 |
| FR | 2768189 A1 | 3/1999 |
| FR | 2836185 A1 | 8/2003 |
| FR | 3075068 A1 | 6/2019 |
| GB | 2332378 B | 12/2001 |
| GB | 2389629 B | 12/2005 |
| GB | 2524608 B | 4/2020 |
| JP | S5994064 A | 5/1984 |
| JP | S62210042 A | 9/1987 |
| JP | H02167469 A | 6/1990 |
| JP | H06324026 A | 11/1994 |
| JP | H07159388 A | 6/1995 |
| JP | 2587162 Y2 | 12/1998 |
| JP | H02170047 A | 6/1999 |
| JP | 2603770 Y2 | 3/2000 |
| JP | 3665680 B2 | 6/2005 |
| JP | 2006003203 A | 1/2006 |
| JP | 3780917 B2 | 5/2006 |
| JP | 2006122735 A | 5/2006 |
| JP | 3865119 B2 | 1/2007 |
| JP | 3959436 B2 | 8/2007 |
| JP | 4082309 B2 | 4/2008 |
| JP | 2009018311 A | 1/2009 |
| JP | 4348820 B2 | 10/2009 |
| JP | 4360206 B2 | 11/2009 |
| JP | 4683066 B2 | 5/2011 |
| JP | 5427603 B2 | 2/2014 |
| KR | 20020085903 A | 11/2002 |
| WO | 1997000125 A1 | 1/1997 |
| WO | 0022436 A1 | 4/2000 |
| WO | 0196024 A2 | 12/2001 |
| WO | 0221121 A1 | 3/2002 |
| WO | 2003015890 A1 | 2/2003 |
| WO | 2003024598 A1 | 3/2003 |
| WO | 2003098218 A1 | 11/2003 |
| WO | 2006017039 A1 | 2/2006 |
| WO | 2007021755 A2 | 2/2007 |
| WO | 2010015238 A1 | 2/2010 |
| WO | 2010030720 A1 | 3/2010 |
| WO | 2010107677 A1 | 3/2010 |
| WO | 2010083884 A1 | 7/2010 |
| WO | 2011003412 A2 | 1/2011 |
| WO | 2011037530 A1 | 3/2011 |
| WO | 2013013717 A2 | 1/2013 |
| WO | 2013159816 A1 | 10/2013 |
| WO | 2013187916 A1 | 12/2013 |
| WO | 2014034259 A1 | 3/2014 |
| WO | 2016082520 A1 | 6/2016 |
| WO | 2018191787 A1 | 10/2018 |
| WO | WO-2018191787 A1 * 10/2018 ......... B01F 15/0264 |
| WO | 2018226907 A2 | 12/2018 |
| WO | 2019086671 A1 | 5/2019 |
| WO | 2019097490 A1 | 5/2019 |
| WO | 2019167011 A4 | 9/2019 |
| WO | 2019186223 A1 | 10/2019 |
| WO | 2019204508 A1 | 10/2019 |
| WO | 2019229819 A1 | 12/2019 |
| WO | 2019240653 A1 | 12/2019 |
| WO | 2020099865 A1 | 5/2020 |

OTHER PUBLICATIONS

International Search Report and Written Opinion in PCT/US2021/039065 dated Oct. 19, 2021.
"HyperShear(TM) HPLC and UHPLC Mixers" 2014, Analytical Scientific Instruments US, Inc.
Chen, et al. "Combining selection valve and mixing chamber for nanoflow gradient generation: Toward developing a liquid chromatography cartridge coupled with mass spectrometer for protein and peptide analysis." Analytica Chimica Acta 887 (2015) pp. 230-236.
Davis, et al. "A Sample, Reliable Rapid-Mixing Apparatus for Continuous-Flow Studies," Analytical Biochemistry 97 (1979) pp. 428-437.
Huft, et al. "Microfluidic Integration of Paralell Solid-Phase Liquid Chromatography," Analytical Chemistry 85 (2013) 2999-3005.
Shi, et al., "Mixing enhancement via a serpentine micromixer for real-time activation of carboxyl," Chemical Engineering Journal, 2019. https://doi.org/10.1016/j.cej.2019.123642.
Gilbert, Scott "Lab-on-a-chip miniaturized on-line liquid chromatography," Crystal Vision Microsystems, CPAC Satellite Workshop, Rome, Italy, Mar. 20-22, 2006.
"Dynamic Mixing Chamber Manual V.7119-1," Knauer, Berlin, Germany, Aug. 2016.
"HPLC Gradient Mixers," Mott, 2020. https://mottcorp.com/product/mixers/hplc-gradient-static-mixers/.
Ianovska, et al. "Development of small-volume microfluidic chaotic mixers for future application in two-dimensional liquid chromatography," RSC Adv., 2017, 7, pp. 9090-9099.
Al Lawati, et al. "Combination of capillary micellar liquid chromatography with on-chip microfluidic chemiluminescence detection for direct analysis of buspirone in human plasma," Talanta 127 (2014) pp. 230-238.
Qian, Shizhi and Haim H. Bau, "Magneto-hydrodynamics based microfluidics," Mechanics Research Communications 36 (2009) 10-21.
Steele, et al. "Reducing HPLC/UHPLC System Noise and Volume with High Performance Static Mixers," Feb. 26, 2017, Mott Corporation.
"Varian Dual Chamber Dynamic Mixer Instruction Manual," Varian, Publication No. 0391467400, Issue 5, Feb. 2009.
"Appropriate Mixer Volume for HPLC and UHPLC Applications," Oct. 11, 2014. https://hplctips.blogspot.com/2014/10/appropriate-mixer-volume-for-hplc-and.html.
"Reliable Solvent Mixing in UHPLC," Thermo Fisher Scientific, Inc., 2016.
Chisolm, et al. "Development and characterization of 'push-pull' sampling device with fast reaction quenching coupled to high-performance liquid chromatography for pharmaceutical process analytical technologies," Journal of Chromatography A 1217 (2010) 7471-7477.
Engelhardt, Heinz and Helmut Elgass, "Problems in the application of gradient elution to high-pressure liquid chromatography," Journal of Chromatography 112 (1975) pp. 415-423.
Kaminski, et al. "Programming the Elution Gradient in High-Performance Chromatography by Varying the Volume of the Mixing Chambers," Journal of Chromatography 176 (1979) pp. 171-180.
Kostanyan, Artak E. and Andrei A. Voshkin, "Support-free pulsedliquid-liquid chromatogrpahy," Journal of Chromatography A 1216 (2009) pp. 7761-7766.
Takeuchi, Toyohide and Daido Ishii, "Continuous Gradient Elution in Micro High-Performance Liquid Chromatography," Journal of Chromatography 253 (1982) pp. 41-47.
Wang, et al. "On-line two-dimensional countercurrent chromatography x high performance liquid chromatography system with a novel fragmentarydilution and turbulent mixing interface for preparation of coumarinsfrom Cnidium monnieri" Journal of Chromatography A, 1406 (2015) pp. 215-223.
International Search Report and Written Opinion in PCT/US2022/028299 dated Aug. 2, 2022.
International Search Report and Written Opinion in PCT/US2022/030670 dated Sep. 23, 2022.
International Preliminary Report on Patentability in International Application No. PCT/US2021/039065, dated Jan. 19, 2023.
International Preliminary Report on Patentability in International Application No. PCT/US2021/039058, dated Jan. 19, 2023.
International Preliminary Report on Patentability in PCT/US2022/028299 dated Nov. 30, 2023.

* cited by examiner

MIXER FOR LIQUID CHROMATOGRAPHY

RELATED APPLICATION

This application claims the benefit of the earlier filing date of U.S. Provisional Patent Application Ser. No. 63/048,684, filed Jul. 7, 2020, and titled "Mixer for Liquid Chromatography," the entirety of which is incorporated herein by reference.

FIELD OF THE INVENTION

The invention relates generally to liquid chromatography systems. More particularly, the invention relates to a mixer for mixing solvent composition streams in a liquid chromatography system.

BACKGROUND

Chromatography systems and methods can be applied to separate a mixture. In liquid chromatography, a sample containing a number of components to be separated is injected into a system flow and directed to a chromatographic column. The column separates the mixture by differential retention into its individual components. Typically, the components elute from the column as distinct bands separated in time.

A typical liquid chromatography system includes one or more pumps for delivering a fluid (the "mobile phase") at a controlled flow rate and composition, an injector to introduce a sample solution into the flowing mobile phase, a chromatographic column that contains a packing material or sorbent (the "stationary phase"), and a detector to detect the presence and amount of the sample components in the mobile phase leaving the column. Some liquid chromatography systems may require that a sample be diluted before the sample is injected into the mobile phase flowing to the chromatography column. When the mobile phase passes through the stationary phase, each component of the sample typically emerges from the column at a different time because different components in the sample generally have different affinities for the packing material. The presence of a particular component in the mobile phase exiting the column may be detected by measuring changes in a physical or chemical property of the eluent. By plotting the detector signal as a function of time, response "peaks" corresponding to the presence and quantities of the components of the sample may be observed.

In gradient elution chromatography, the mobile phase is typically generated by pumping and then mixing two or more independently controlled solvent packet volumes when mixing is performed at low pressure. The volumes of the solvent packets are typically fractions of a pump stroke volume of a reciprocating pump. These solvent packets are concatenated to form a serial train of solvent plugs of different composition at low pressure (e.g., atmospheric pressure) before arriving at the pump system. Alternatively, the solvent packets are merged at high pressure in a tee junction downstream from the pump system. A mixer is typically used to ensure that the time-programmed composition of the mobile phase at the inlet of the chromatographic column is accurate and has a low compositional noise level through the duration of the chromatographic separation to maximize detection sensitivity.

Two types of mixers are often used to perform the desired mixing of the solvent packets. The first type is a column packed with large (e.g., 200 μm nominal diameter) nonporous beads. The void mixer volume may vary from a few tens of microliters to more than several hundred microliters, according to the type of liquid chromatography system being used. The second type is a microfluidic device in which the received solvent composition flow is split into multiple flow paths of differing lengths which are subsequently merged to provide a single outlet flow. Regardless of the type of mixer, the goal is to eliminate the periodic composition noise generated by the reciprocating pumps in the pump system.

The first type of mixer is subject to poor mixer to mixer reproducibility due to the random nature of the packing of the columns with the nonporous beads. Furthermore, this type of mixer has limited mixing capability and compositional noise reduction because packed column beds are generally intended for separation of fractions as opposed to mixing. These problems exist even with larger sized beads. The second type of mixer is more difficult to manufacture due to its structural complexity and is not designed to eliminate periodic noise. The second type generates a wide retention time distribution (RTD) of a pulse input. Furthermore, the second type of mixer has an asymmetric retention time distribution which limits its ability to rapidly achieve the time-programmed composition of the mobile phase.

SUMMARY

In an aspect of the present disclosure, a mixer for liquid chromatography includes a flow distributor, a mixing disk and a flow collector. The fundamental rationale for the design of a disk-shaped mixer is that, for a fixed mixer volume $V_{mixer}$, filled with a dispersive material of plate height H, the volume-based dispersion or variance, $\sigma_{v,mixer}^2$, of the RTD is inversely proportional to its length L:

$$\sigma_{v,mixer}^2 = \frac{HV_{mixer}^2}{L}$$

The flow distributor has a distributor inlet port and a distributor outlet port. The distributor inlet port is configured to receive a flow of a compositional solvent stream and the distributor outlet port has an outlet cross-section and is configured to provide the compositional solvent stream distributed across the outlet cross-section. The mixing disk has an inlet face, an outlet face and a plurality of channels each having an inlet end at the inlet face and an outlet end at the outlet face. The inlet face is in communication with the distributor outlet port. The channels have a flow direction anisotropy between the inlet and outlet faces. The flow collector has a collector inlet port and a collector outlet port. The collector inlet port has an inlet cross-section and is in communication with the outlet face of the mixing disk to receive the flow of the compositional solvent stream after passing through the mixing disk.

The mixing disk may include a dispersive medium having a random porous structure. The channels may have a tortuosity of at least five and no greater than ten. The mixing disk may be formed of a material comprising a glass, a polymer or a metal. The mixer disk may have a void volume that is greater than a volume of the flow distributor and greater than a volume of the flow collector. The mixing disk may include at least one mesh layer.

The mixer may have a retention time distribution that is dependent on a structure of the channels between the inlet face and the outlet face of the mixing disk. Individual flows of the compositional solvent stream distributed across the outlet cross-section of the flow distributor may have a diameter between approximately 100 μm to approximately 200 μm.

An area of the outlet cross-section of the flow distributor may be equal to a cross-sectional area of the inlet face of the mixing disk. An area of the inlet cross-section of the flow collector may be equal to a cross-sectional area of the outlet face of the mixing disk.

The flow distributor may include an angular dispersion plate and/or a radial dispersion plate. The flow distributor may be a fractal flow distributor. The flow collector may include an angular dispersion plate and/or a radial dispersion plate. The flow collector may be a fractal flow collector.

The flow distributor may include a plurality of openings at the distributor outlet port and a plurality of internal flow paths defined between the distributor inlet port and the distributor outlet port to conduct the compositional solvent stream to the distributor outlet ports. The openings may be disposed along a plurality of concentric circles defined on the distribution outlet port. The flow collector may include a plurality of openings at the collector inlet port and a plurality of internal flow paths defined between the collector inlet port and the collector outlet port to conduct the compositional stream from the mixing disk to the collector outlet port. The openings at the distributor outlet port may be arranged identically to the openings at the collector inlet port. The number of openings at the distributor outlet port may be different from the number of openings at the collector inlet port.

The flow collector may include a plurality of openings at the collector inlet port and a plurality of internal flow paths defined between the collector inlet port and the collector outlet port to conduct the compositional stream from the mixing disk to the collector outlet port. The openings may be disposed along a plurality of concentric circles defined on the collector input port.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the technology.

DETAILED DESCRIPTION

Reference in the specification to an "example," "embodiment" or "implementation" means that a particular feature, structure or characteristic described in connection with the example, embodiment or implementation is included in at least one embodiment of the teaching. References to a particular example, embodiment or implementation within the specification do not necessarily all refer to the same embodiment.

As used herein, a mobile phase is a solvent or mixture of solvents used to carry a sample and to pass through the stationary phase of a liquid chromatography system. The mobile phase may be a gradient mobile phase in which the composition of the mobile phase changes with time. The mobile phase may also be referred to herein as the system flow which typically flows from the source of the mobile phase to at least the detector of the liquid chromatography system.

In brief overview, a passive mixer having a disk-shaped mixing element is described. The mixer improves the accuracy and precision of a time-programmed composition of a mobile phase delivered by reciprocating pumps in a liquid chromatography system. The mixer includes a flow distributor, a mixing disk and a flow collector. The mixing disk has an inlet face, an outlet face and a plurality of channels each having an inlet end at the inlet face and an outlet end at the outlet face. The channels have a flow direction anisotropy between the inlet and outlet faces. A compositional solvent stream is distributed across an inlet face of the mixing disk by the flow distributor and is collected after exiting at the outlet face after passing through the mixing disk such that the output of the mixer is a mixed compositional solvent stream.

The present disclosure will now be described in more detail with reference to embodiments thereof as shown in the accompanying drawings. While the present teaching is described in conjunction with various embodiments and examples, it is not intended that the present teaching be limited to such embodiments. On the contrary, the present disclosure encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure.

Figure 1:
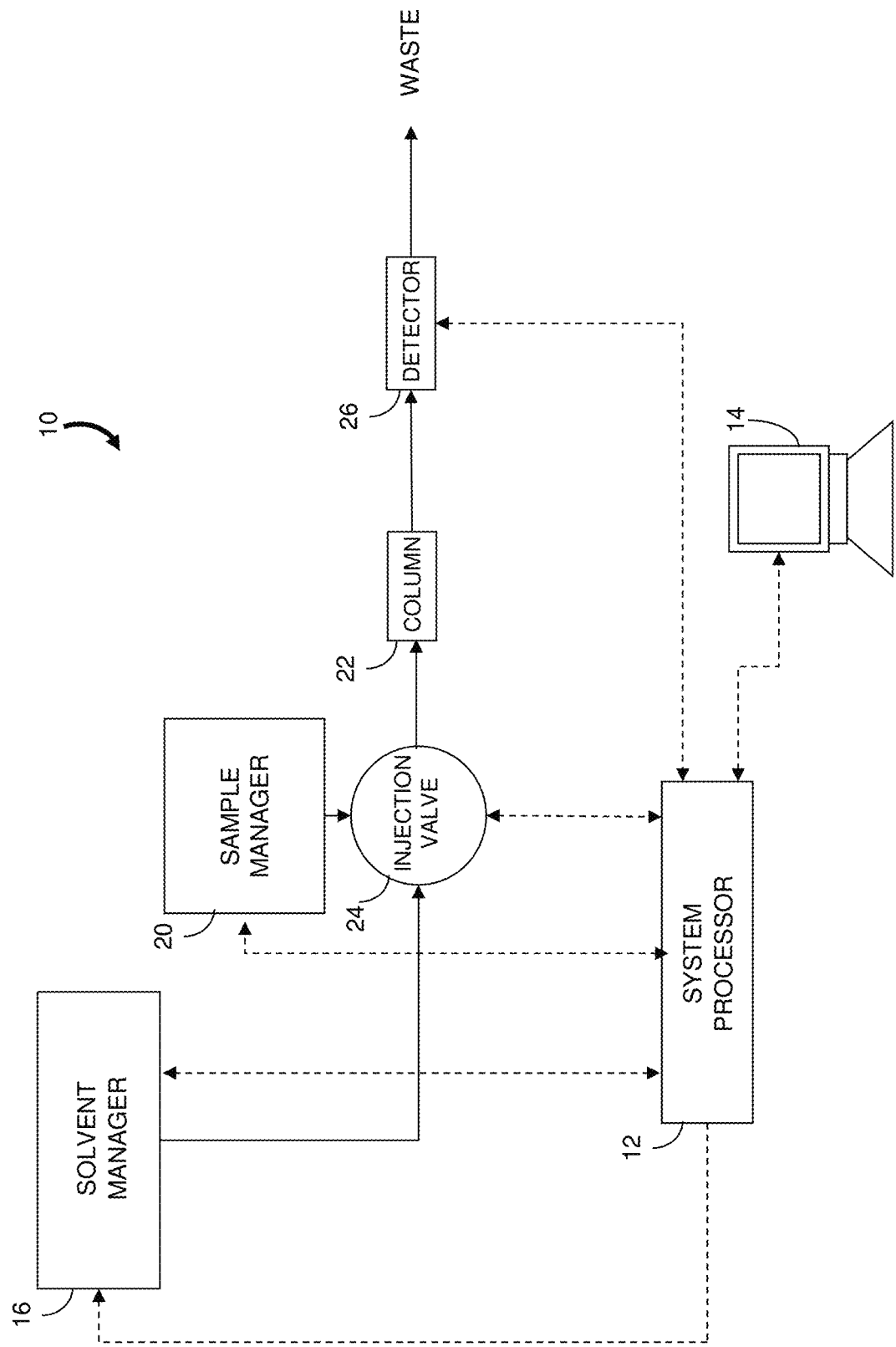
FIG. 1 is a block diagram of a liquid chromatography system that can include an embodiment of a mixers described herein.

FIG. 1 is a block diagram of a liquid chromatography system 10 that can include an embodiment of the mixers described below. The system 10 includes a system processor 12 (e.g., microprocessor and controller) in communication with a user interface device 14 for receiving input parameters and displaying system information to an operator. The system processor 12 communicates with a solvent manager 16 which provides one or more solvents for a mobile phase. For example, the solvent manager 16 may include a mixer to mix two or more solvents and may provide a gradient mobile phase. A sample provided by a sample manager 20 is injected into the mobile phase upstream from a chromatographic column 22 at an injection valve 24. The sample manager 20 can include one or more sources of a sample such as a sample reservoir, vial or other container that holds a volume of the sample. In some embodiments, the sample manager 20 is a flow through needle sample manager that includes a sample needle and sample syringe used to aspirate a sample from a sample source. In some instances, the sample manager 20 provides a diluted sample that includes the sample and a diluent. The chromatographic column 22 is coupled to a detector 26 which provides a signal to the system processor 12. The signal is responsive to various components detected in the eluent from the column 22. After passing through the detector 26, the system flow exits to a waste port; however, when used for fraction collection, a diverter valve may be included to temporarily redirect the system flow to one or more collection vessels.

Figure 2:
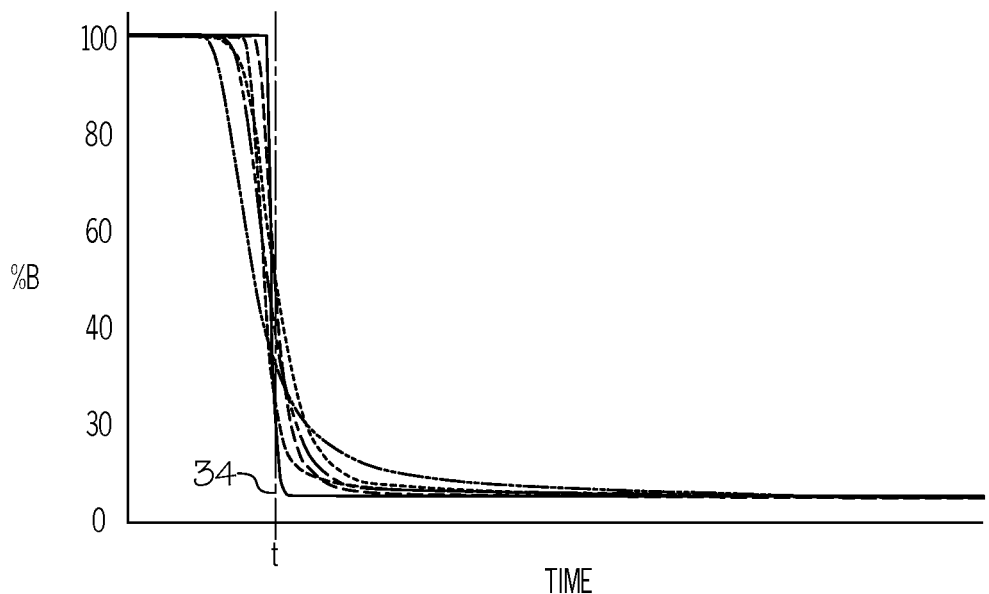
FIG. 2 is a graphical depiction of a stepwise change in the composition of a mobile phase for different liquid chromatography systems each having a conventional mixer.

FIG. 2 is a graphical depiction of the presence of a solvent B in a mobile phase as a function of time for different liquid chromatography systems each having a conventional mixer. The horizontal axis depicts time and the vertical axis depicts absorption units based on the system detector. The plots illustrate how different systems respond to a programmed stepwise decrease (vertical dashed line 34 at time t) of solvent B (acetone) from 100% to 10% in an aqueous mobile phase composition. In the absence of the mixer, a sharp transition may be achieved; however, a large compositional noise may be present.

Figure 3:
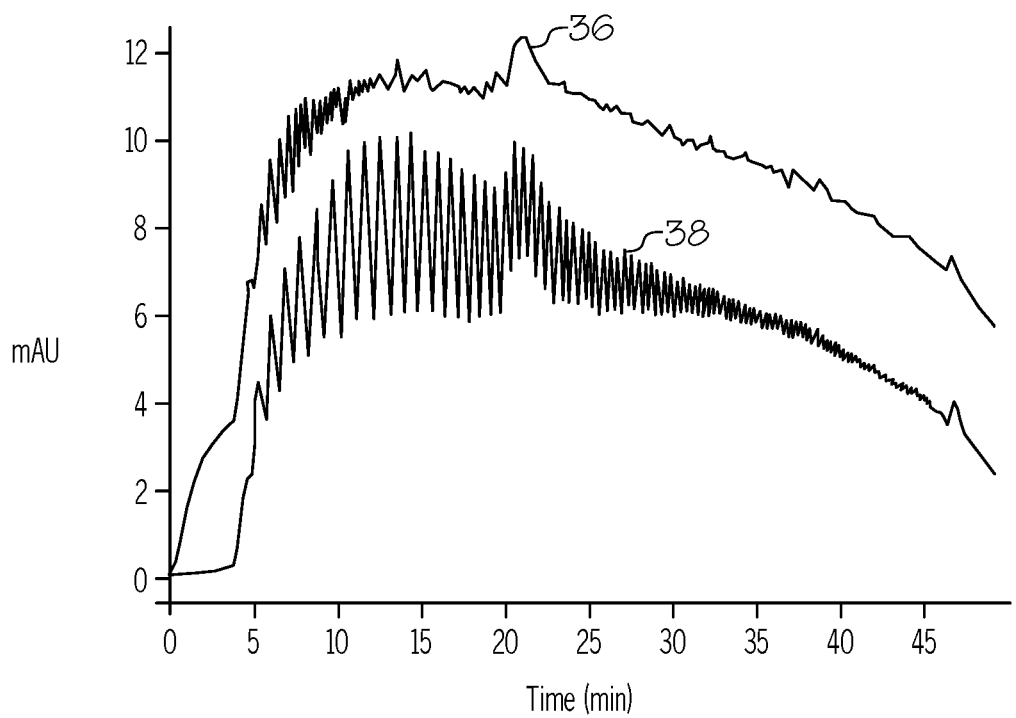
FIG. 3 is a graphical depiction of the presence of a solvent in the mobile phase of a liquid chromatography system over time for two systems having different reciprocating pumps.

FIG. 3 is a graphical depiction of the presence of a solvent in the mobile phase of a liquid chromatography system over time. The vertical axis represents absorption units and corresponds to the presence of a particular solvent component (e.g., acetonitrile in an aqueous solvent composition). The upper plot 36 is for a reciprocating pump having a 20 μL pump stroke volume and the lower plot 38 is for a reciprocating pump having a 100 μL pump stroke volume. The high frequency noise evident in the plots 36 and 38 is due to the operation of the plunger in the reciprocating pumps.

Figure 4:
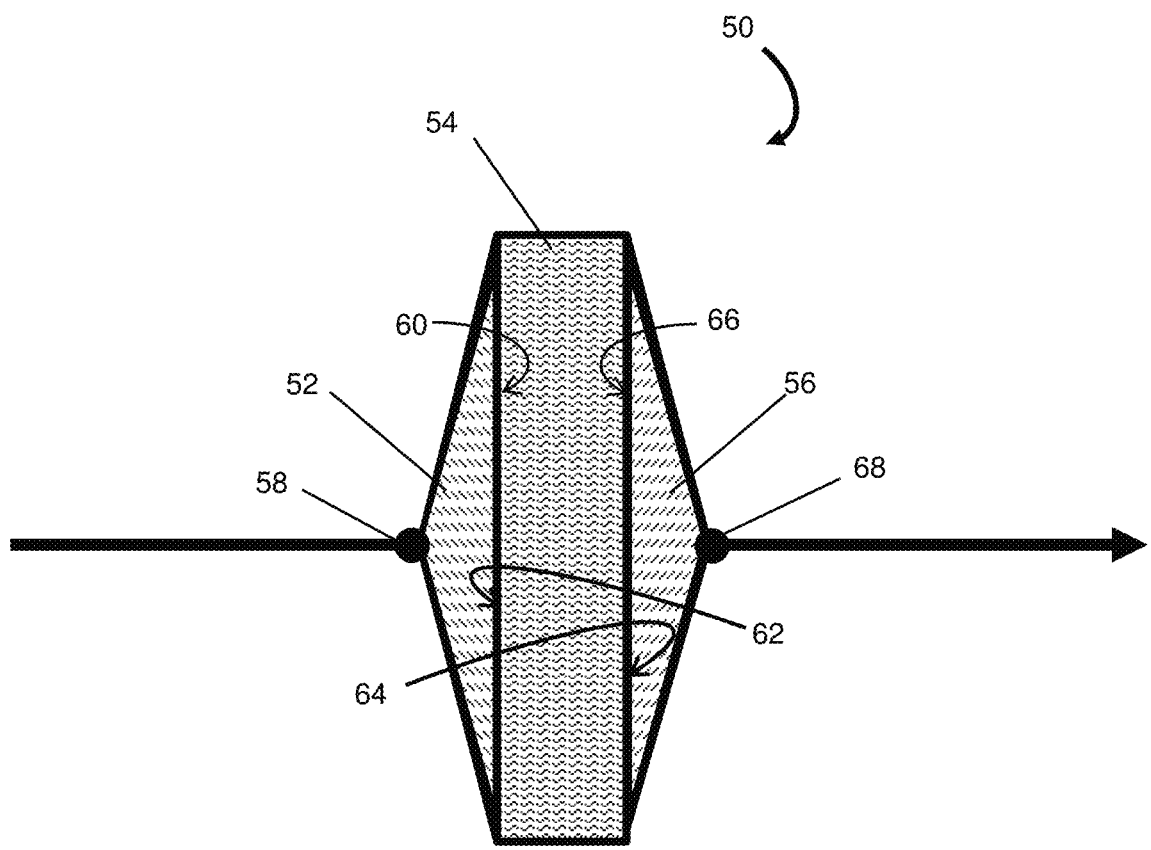
FIG. 4 is a schematic diagram of a mixer having a flow distributor, a mixing disk and a flow collector that can be used for mixing a compositional solvent stream in a liquid chromatography system.

FIG. 4 is a highly schematic diagram of a mixer 50 that can be used for mixing a compositional solvent stream in a liquid chromatography system. The mixer 50 includes a flow distributor 52, a mixing disk 54 and a flow collector 56.

The flow distributor has a distributor inlet port 58 and a distributor outlet port 60 having an outlet cross-section. The flow distributor 52 distributes the composition solvent stream received at the distributor inlet port 58 substantially evenly across the outlet cross-section at the distributor outlet port 60.

The mixing disk 54 has an inlet face 62, an outlet face 64 and channels that have inlet ends at the inlet face 62 and outlet ends at the outlet face 64. In some embodiments, the mixing disk 54 is a circular disk; however, alternative embodiments may include disks having other shapes such as a rectangular edge or other non-circular outer edge. The inlet face 62 is in communication with the distributor outlet port 60. The channels have a flow direction anisotropy between the inlet face 62 and outlet face 64. For example, the flow path length defined between the inlet and outlet ends of each channel may generally be different and vary across a range of flow path lengths as described in more detail below. Each channel generally does not have a direct path between the inlet face 62 and outlet face 64 but instead is defined by changes in direction such that channel direction varies along its length. For example, each path may have one or more upward, downward and/or sideways excursions (i.e., radial excursions) such that the path is substantially nonlinear. In some embodiments, channels may allow the liquid to flow backwards along portions of a flow path although in such embodiments the pressure resistance may be significant. The channel direction at a portion along its length includes a longitudinal component (defined along a "thickness axis" that is perpendicular to the disk faces) and a radial component (defined in a plane orthogonal to the thickness axis). Thus, the width of an individual solvent component of a solvent packet is broadened in its passage through the mixing disk 54 as the packet is distributed into different channels having different flow path lengths through the disk material and the stacked packets of solvents generated by the gradient proportional valve can be mixed effectively in the mixing disk volume. The solvent component is thereby mixed with adjacent solvent components that are also broadened by passage through the mixing disk 54. The mixing disk 54 can be fabricated using a three-dimensional (3D) manufacturing process (e.g., by stereolithography) to achieve mixer-to-mixer reproducibility of the mixer properties.

The flow collector 56 has a collector inlet port 66 and a collector outlet port 68. The collector inlet port 66 has an inlet cross-section and is in communication with the outlet face 64 of the mixing disk 54 to thereby receive the flow of the compositional solvent stream after passing through the mixing disk 54. The flow collector 56 substantially evenly collects and combines the flows from the ends of the channels at the outlet face 64 of the mixing disk 54 into a single flow at the collector output port 68.

In some embodiments, the area of the outlet cross section of the flow distributor 52 is substantially equal to a cross-sectional area of the inlet face 62 of the mixing disk 54. Similarly, an area of the inlet cross-section of the flow collector 56 may be substantially equal to a cross-sectional area of the of the outlet face 66 of the mixing disk 54. The flow distributor 52 may be a radial flow distributor, an angular flow distributor, a combination of radial and angular flow distributors, or a fractal flow distributor. Similarly, the flow collector 56 may be a radial flow collector, an angular flow collector, a combination of a radial and angular flow collector, or a fractal flow collector. These types of flow distributors 52 and flow collectors 56 enable most of the volume of the mixing disk 54 to be used for mixing. Similarly, use of a disk for mixing yields maximum mixing for a given mixer volume.

In the absence of a flow restriction, the limited divergence of the received solvent stream would not spread across the full input face 62 of the mixing disk 54. Moreover, the performance of the mixer 50 is proportional to the square of the mixer volume. Thus, the flow distributor 52 is used to evenly distribute the compositional solvent stream receive at the inlet port 58 into a large number (e.g., at least ten) of individual flows incident at the inlet face 62 of the mixing disk 54. For example, the solvent flow at the inlet port 58 may be approximately 100 μm to 200 μm in diameter and each individual flow may similarly be approximately 100 μm to approximately 200 μm in diameter. The flow collector 56 similarly evenly collects the individual flows exiting from the outlet face 64 of the mixing disk 54 into a single flow of approximately 100 μm to 200 μm in diameter. This range of diameters can induce significant molecular dispersion in the mixing disk 54 and provide a flow restriction that is greater than the flow restrictions of the flow distributor 52 and flow collector 56.

As used herein, tortuosity means a ratio of a flow path length of a channel between its ends normalized to the straight-line distance between its ends. Thus, tortuosity is a characterization of the convoluted channels for fluid dispersion through the mixing medium. The tortuosity of the mixing disk 54 is given by the average flow path length of the channels relative to the thickness of the mixing disk 54. In some embodiments, the tortuosity of the channels is at least five and, in other embodiments, the tortuosity of the channels does not exceed ten. The mixer 50 may be characterized by a RTD which is determined by the different flow path lengths through the mixing disk 54. The objective of the random channel structure through the mixing disk 54 is to enlarge the RTD. The flow anisotropy and multi-channel tortuosity of the mixing disk 54 enables a skewness for the RTD to be reduced to a value close to zero and allows the solvent composition of the solvent mixture at the collector outlet port 68 to more quickly achieve the programmed solvent composition.

In some embodiments, the flow path lengths are randomly defined according to the internal porous structure of the mixing disk 54. The mixing disk 54 may be formed from a dispersive material having a random porous structure. In this instance, the flow path lengths of the channels are substantially uncorrelated to each other.

The void volume of the mixing disk 54 is preferable selected based on the pump stroke volume for the pump system. In some embodiments, the value of the void volume is between about two time the pump stroke volume to about three times the pump stroke volume. For instance, based on three times the pump stroke volume, a 400 μm mixer may be used with a pump system having a 132 μL pump stroke volume.

In some embodiments, the mixing disk 54 is manufactured via a machining process or 3D printing. The mixing disk 54 may include a predefined arrangement of channels having a range of path flow path lengths or include a labyrinth of channels. The disk material preferably is a chemically inert material such as a glass, polymer or metal. In one preferred implementation, the mixing disk 54 is a cleaned passivated stainless steel disordered structure that is inert with respect to the solvents.

The volumes of the flow distributor 52 and flow collector 56 are preferably small compared to the void volume of the mixing disk 54 to thereby limit the total pressure drop across the mixer 50. In one example, the pressure drop across the mixer 50 does not exceed 20 MPa (3,000 psi) at a flow rate of 5 mL/min. for water at room temperature.

Figure 5A:
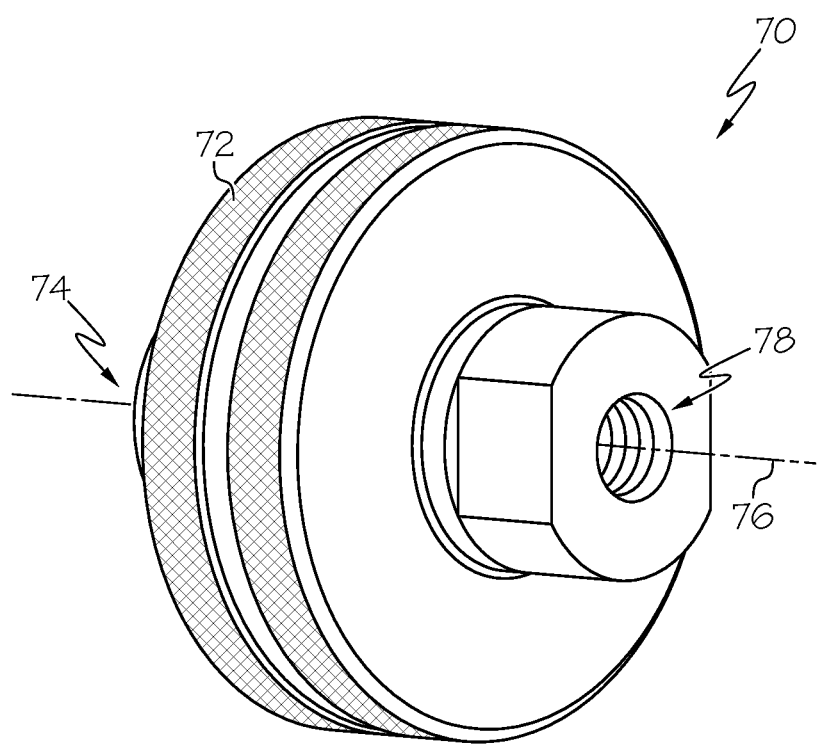
FIG. 5A and FIG. 5B show a perspective view and cutaway schematic view, respectively, of an embodiment of a mixer for a liquid chromatography system.
Figure 5B:
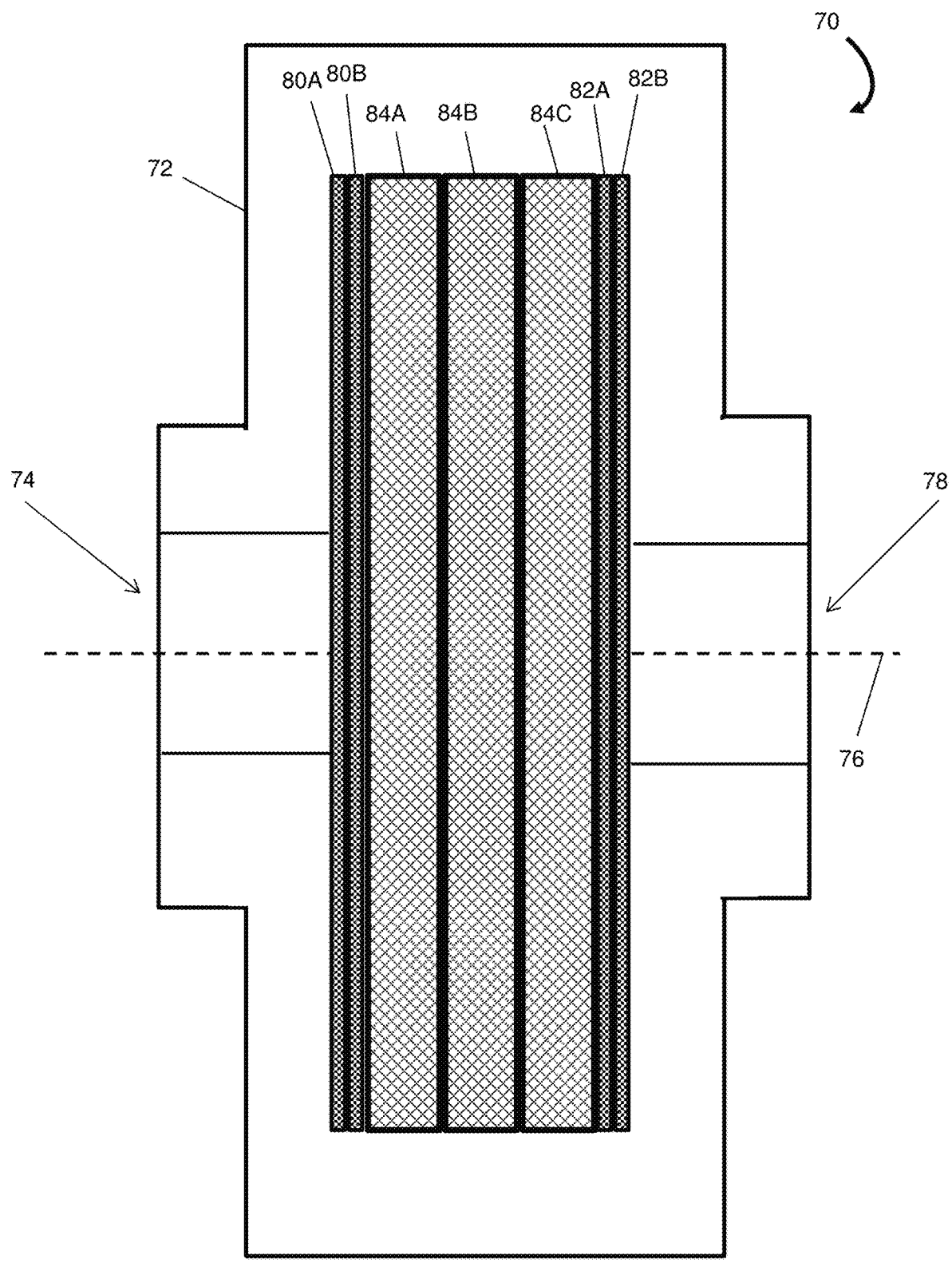

FIG. 5A and FIG. 5B show a perspective view and cutaway schematic view, respectively, of an example of a mixer 70 for a liquid chromatography system. The mixer 70 is formed from stacked layers of metal mesh in which combinations of certain mesh layers substantially correspond to the flow collector 52, mixing disk 54 and flow collector 56 of the mixer 50 of FIG. 4 to enable evaluation of mixing performance.

The mixer 70 includes a housing 72, an inlet 74 to receive a solvent composition flow along flow axis 76, and an outlet 78 to provide a mixed solvent composition flow. The inlet 74 is configured to receive a fitting to couple to a conduit (e.g., stainless steel tubing) that conducts the solvent composition stream. Similarly, the outlet 78 is configured to receive a fitting to couple to a conduit to conduct the mixed solvent composition stream from the mixer 70. Due to the symmetrical construction of the mesh mixer 70, the roles of the inlet 74 and outlet 78 may be reversed.

The mixer 70 includes a first pair of mesh layers 80A and 80B, a second pair of mesh layers 82A and 82B, and a group of three mesh layers 84A, 84B and 84C. In one embodiment, the two pairs of mesh layers 80 and 82 are used as substitutes for the flow distributor and flow collector. Each layer 80 or 82 is a 75 μm thick stainless steel mesh with a 5 μm mesh interstitial spacing. Each pair of layers 80 and 82 acts as a flow restrictor to approximate an ideal flow distribution or ideal flow collection. Each of the three layers 84 in the middle of the layer stack is a 400 μm thick stainless steel mesh with a 40 μm mesh interstitial spacing. The group of layers 84 forms a porous dispersive structure that acts as the mixing disk. It will be noted that in an improved implementation a disordered, or random, material would be used instead of the group of layers 84 with a preferential diffusion in the radial direction thereby increasing the tortuosity and enabling an improvement in the reduction of skewness of the RTD.

Figure 6A:
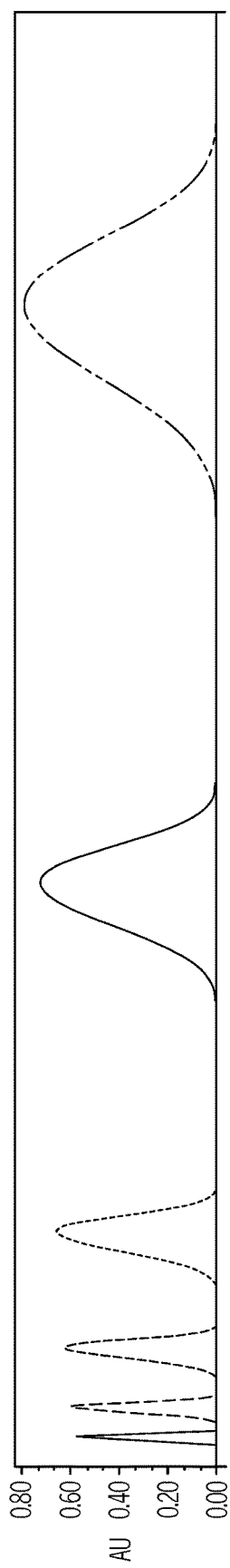
FIGS. 6A, 6B and 6C are graphical representations of the output response of a 200 μm packed bed mixer, a multi-path channel mixer and a mixer utilizing a mixing disk, respectively.
Figure 6B:
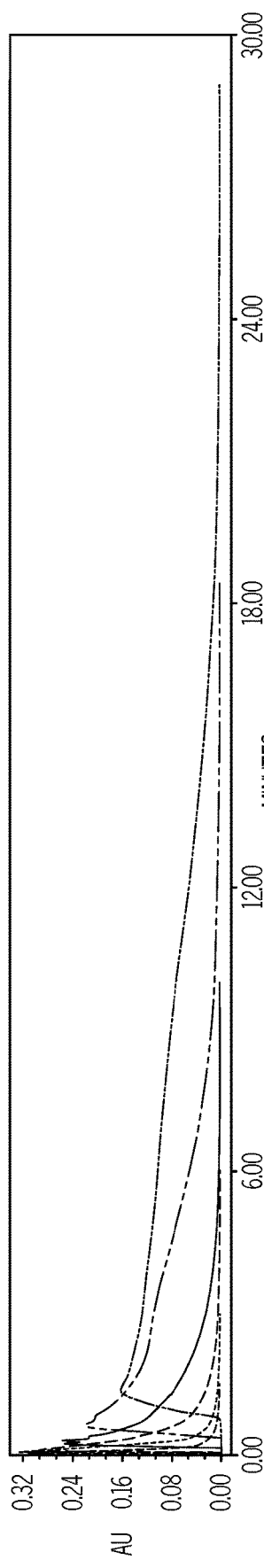
Figure 6C:
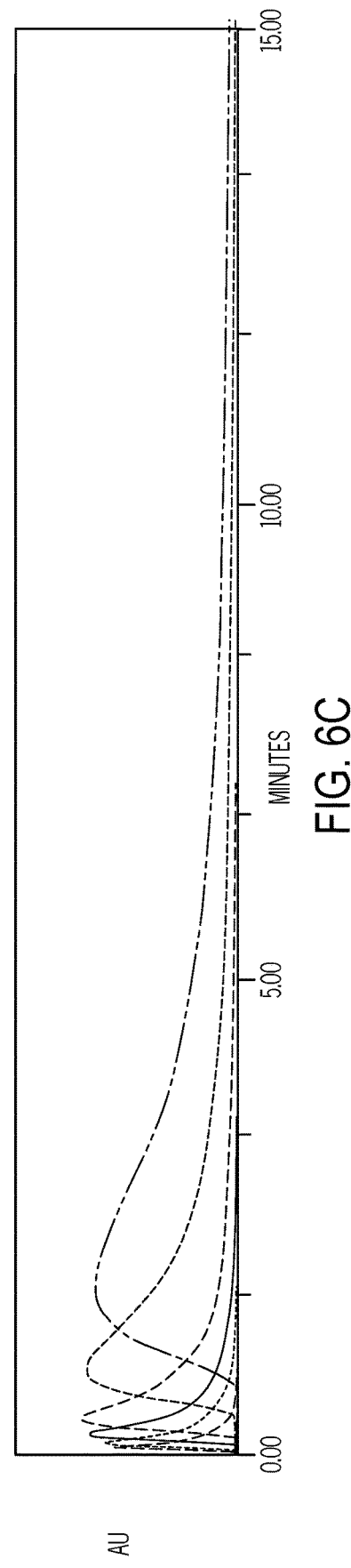

FIGS. 6A, 6B and 6C show the output response of a 200 μm packed bed mixer, a multi-path channel mixer and a mixer utilizing a mixing disk, respectively. Each plot within a figure represents the response of the mixer to a composition impulse in the solvent flow received at the mixer inlet at a different flow rate. The position of each plot with respect to the x-axis is not based on when the response is observed but may be shifted to permit easier observation of the individual plots; however, the shape and width of each plot does represent the shape and duration of each response. Plots displayed to the right are at slower flow rates and exhibit the most spread in time. The flow rates ranged from 0.005 mL/min. to 2.0 mL/min.

Figure 7:
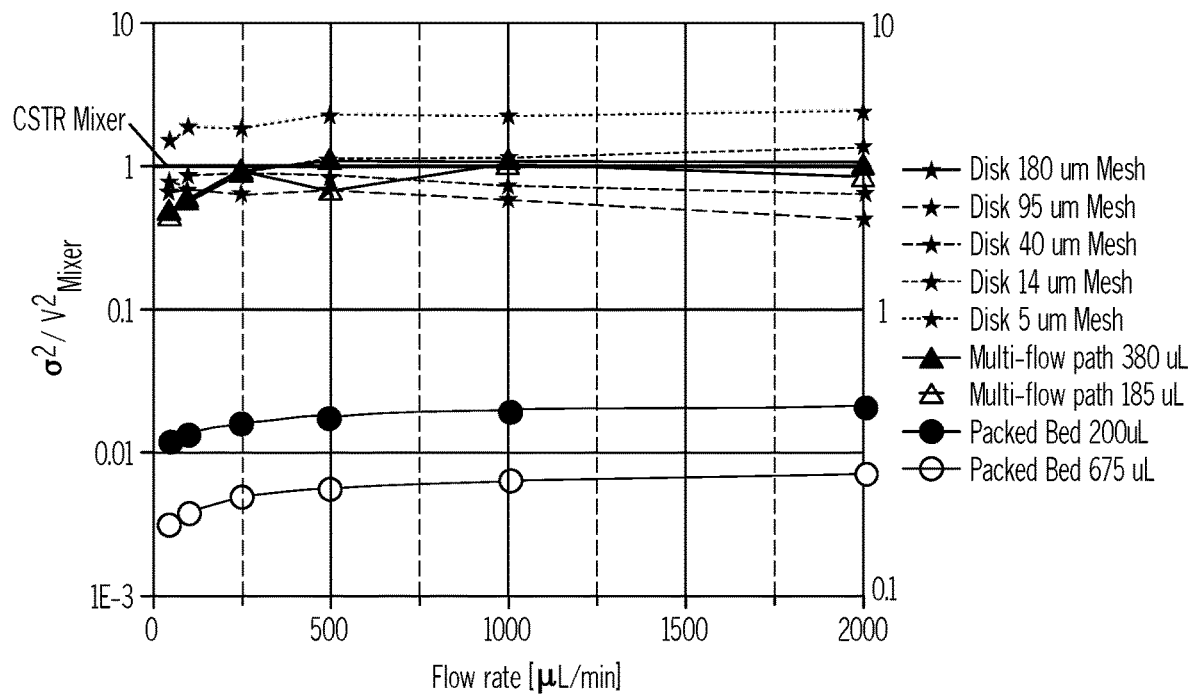
FIG. 7 is a graphical representation of mixing performance as a function of solvent flow rate for nine different mixers.
Figure 8:
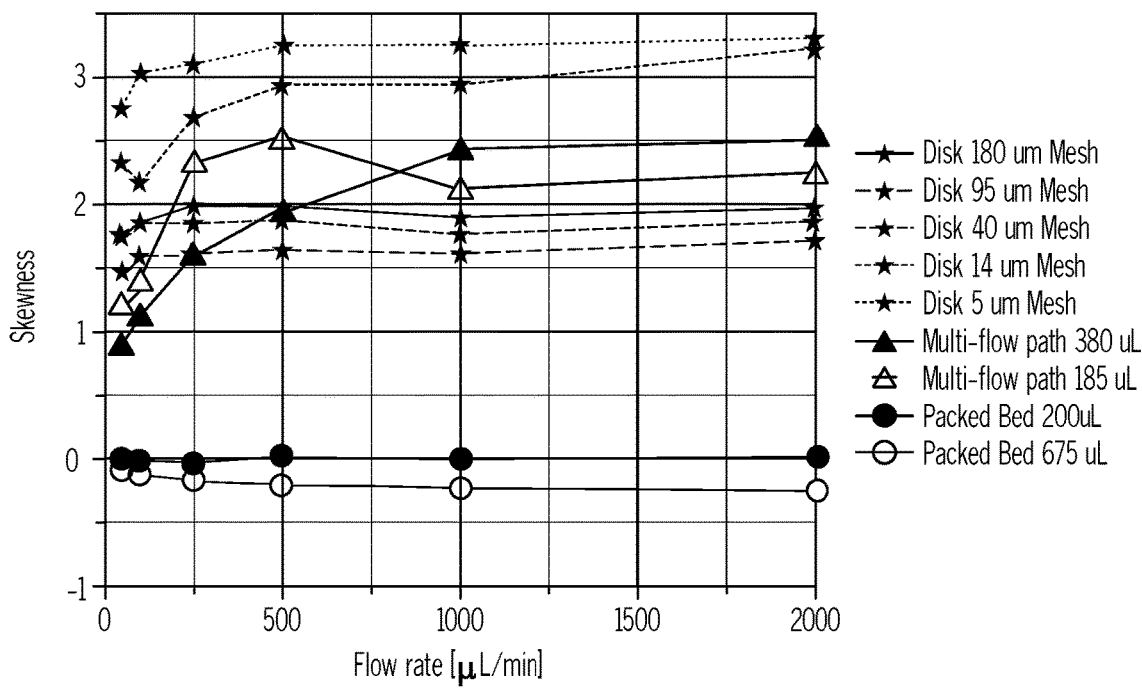
FIG. 8 is a graphical representation of peak skewness as a function of solvent flow rate for the mixers in FIG. 7.

FIG. 7 is a graphical representation of mixing performance (normalized dispersion) as a function of solvent flow rate for nine different mixers and FIG. 8 is a graphical representation of the symmetry, expressed as peak skewness, as a function of solvent flow rate for the mixers in FIG. 7. Mixing performance is expressed as $\sigma^2/V^2$ where $\sigma^2$ is the variance and V is the mixing volume for the mixer where an ideal value for $\sigma^2/V^2$ is one. The skewness value is defined as $\mu_3/\sigma^{1.5}$ where $\mu_3$ is the volume-based third central moment of the concentration distribution. In evaluating the performance characteristics of a mixer, it should be recognized that there is a tradeoff between dispersion performance and symmetry.

Although the packed bed mixers have poor mixing performance by one to two orders of magnitude, their symmetry is best as packed bed mixers have skewness values close to zero at all flow rates. In contrast, the two multi-flow path mixers have better mixing performance; however, their peak skewness is poor at higher flow rates.

The disk mixers have good mixing performance like the multi-flow path mixers and better symmetry than the multi-flow path mixers. Although the 5 μm and 14 μm mesh mixers mix well, they exhibit "tailing" and therefore have bad symmetry as evident in FIG. 8. The 40 μm, 95 μm and 180 μm mesh mixers have the best overall performance based on good mixing and better skewness, disregarding the two packed bed mixers which have poor mixing. Although the multi-flow path mixers are better for skewness at low flow rates, as flow rates increase their symmetry rapidly becomes worse. The mesh mixers are significantly more independent from flow rate, especially the 40, 95 and 180 μm mesh mixers. There is no mixer that is optimum for both mixing and symmetry. The tradeoff is based on selecting mixers having good mixing (FIG. 7) and then identifying one or more mixers from that group based on skewness at all relevant flow rates (FIG. 8). In some instances, the identification is based on an acceptable skewness value that is also substantially independent of flow rate.

Figure 9:
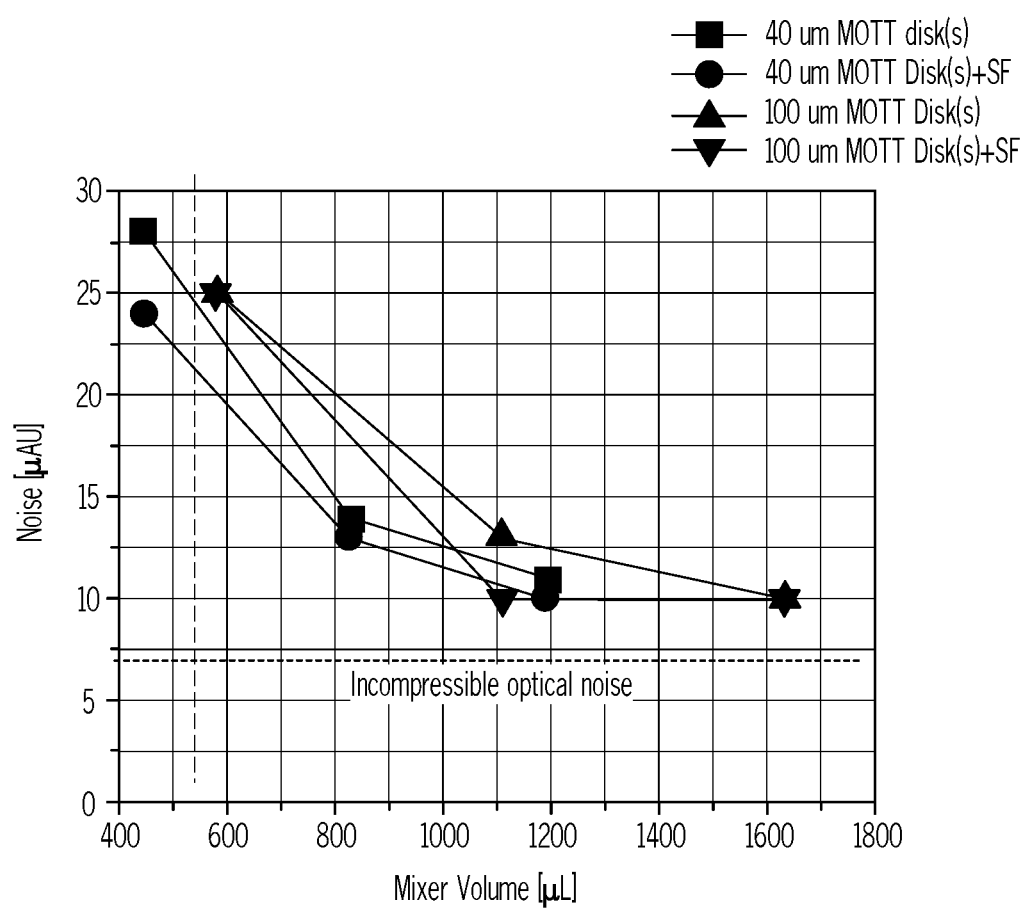
FIG. 9 is a graphical representation of the noise measured for four different implementations of a disk mixer.

An evaluation of disk mixer performance based on disk mixers using 40 μm and 100 μm media grade stainless steel was performed. FIG. 9 shows a graphical presentation of the measurement data. Each data point is plotted as a function of mixer volume in microliters according to the x-axis and noise in micro-absorption units according to the y-axis. The noise value for each data point is determined as an average of the maximum peak to peak noise for sixty measurement windows with each window having a duration of ten seconds. The four plots corresponding to a disk mixer having a 40 um mixer disk medium, a disk mixer having the 40 um disk mixer medium in combination with an additional split flow mixer, a disk mixer having a 100 um disk mixer medium, and a disk mixer having the 100 um disk mixer medium in combination with an additional split flow mixer. The disk mixer media were obtained from Mott Corporation of Farmington, Conn. The measurement results show that the periodic pump noise is no longer observable, even for the lower mixer volumes, with only random peak to peak noise in the measurement windows contributing to the measured noise values. At the higher mixer volumes, the plotted noise values are not significantly greater than the ultraviolet (UV) detector background noise.

Figure 10A:
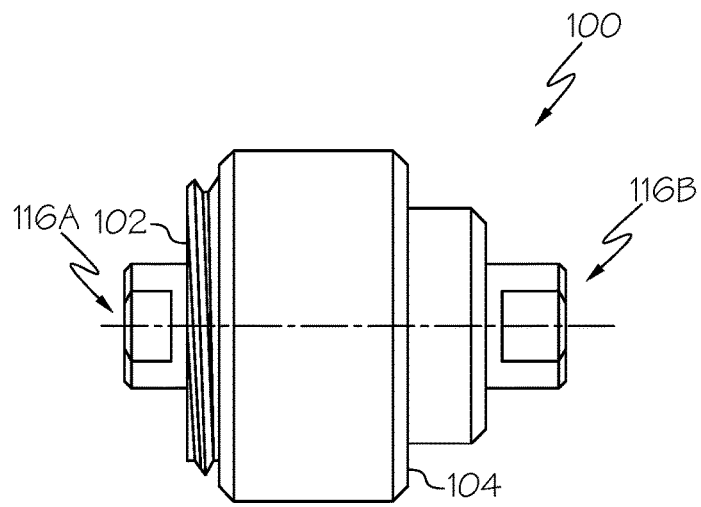
FIGS. 10A, 10B and 10C are a side, end view and cutaway side view, respectively, of an example of a mixer that can be used to mix a compositional solvent stream in a liquid chromatography system.
Figure 10B:
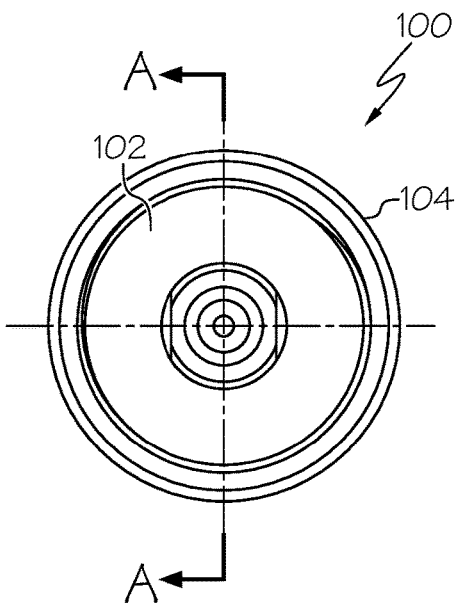
Figure 10C:
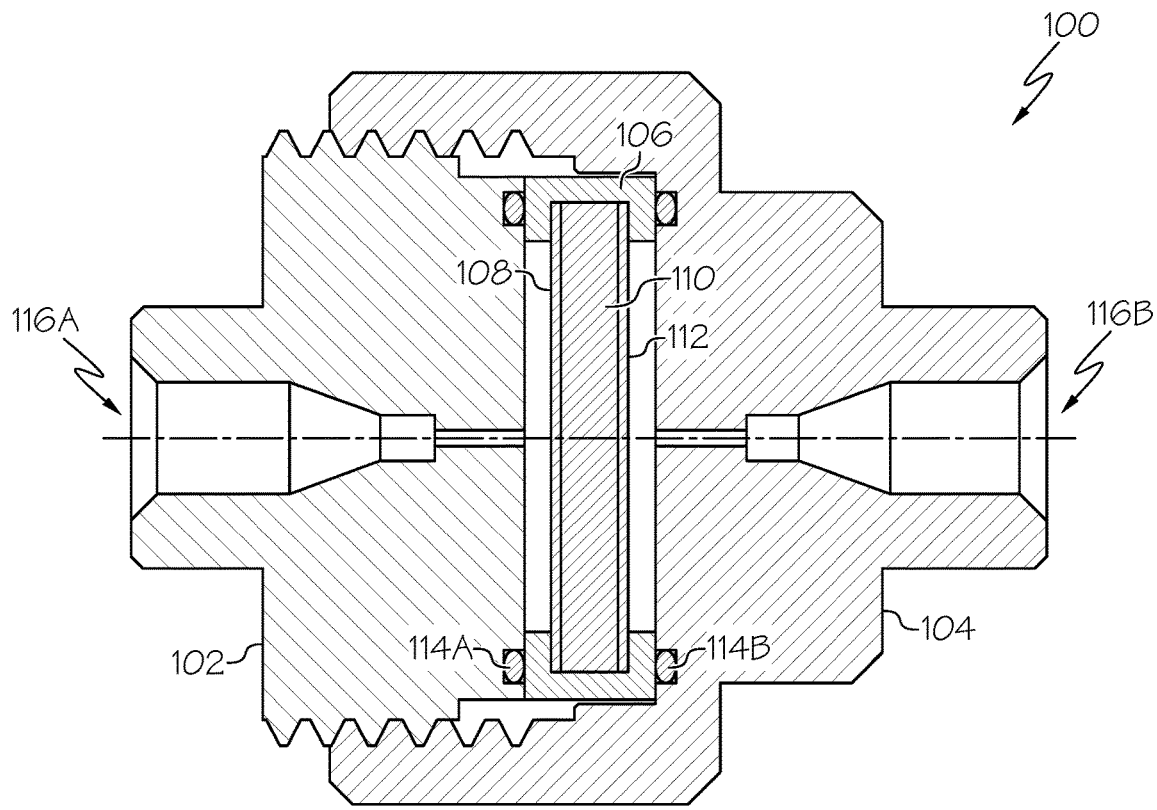

FIGS. 10A, 10B and 10C are a side, end view and cutaway side view, respectively, of an example of a mixer 100 that can be used to mix a compositional solvent stream in a liquid chromatography system. The mixer includes a first housing part 102, a second housing part 104, an annular ring 106, a flow distributor 108, a mixing disk 110 and a flow collector 112. The flow distributor 108, mixing disk 110 and flow collector 112 are held within the annular ring 106. The first housing part 102 includes threads on an outer surface which engage threads on an inner bore surface of the second housing part 104. The first housing part 102 is inserted into the second housing part 104 until both components are in contact with opposite sides of the annular ring 106. A pair of gaskets 114A and 114B create a fluidic seal between the annular ring 106 and the first housing part 102 and the annular ring 106 and the second housing part 104, respectively. Liquid entering the mixer 100 at mixer port 116A exits at mixer port 116B. The mixer 100 may alternatively be used with liquid flowing in the reverse direction, that is, by entering at mixer port 116B and exiting at mixer port 116A.

Figure 11:
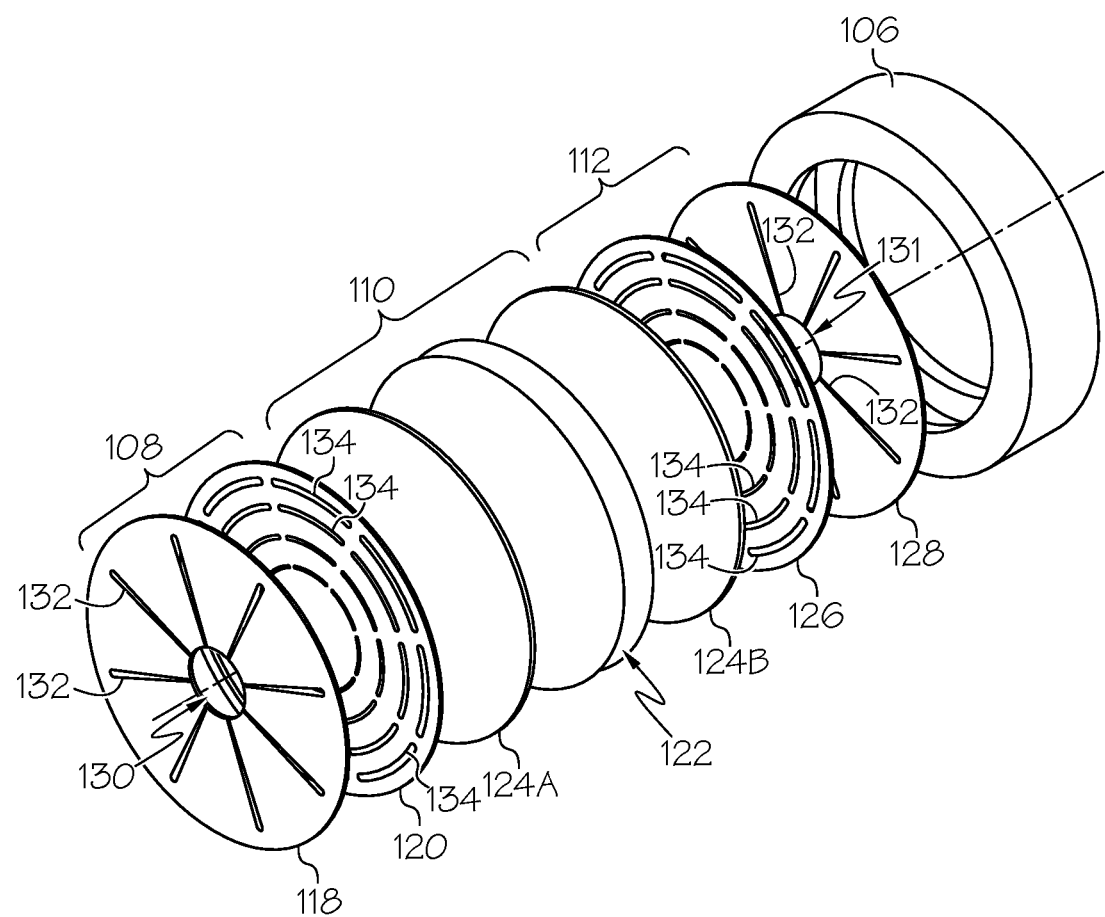
FIG. 11 is an exploded view of the annular ring shown in FIG. 10C showing the components held within the annular ring.

FIG. 11 is an exploded view of the annular ring 106 and the components held within the ring 106. The flow distributor 108 includes an inlet angular dispersion plate 118 and an inlet radial dispersion plate 120. The mixing disk 110 includes a disk 122 having a random porous structure disposed between two fine mesh disks 124A and 124B (e.g., two metal mesh screens each having a 5 μm spacing). The flow collector 112 includes an outlet radial dispersion plate 126 and an outlet angular dispersion plate 128.

The inlet and outlet angular dispersion plates 118 and 128, respectively, include a central opening 130 and 131, respectively, with slots 132 extending radially from the central opening 130 and 131. The slots 132 are wedge-shaped, that is, increasing in width with increasing distance from the center. The inlet and outlet radial dispersion plates 120 and 126, respectively, include an arrangement of concentric arc-shaped slots 134 arranged at one of three different radii from the center of the plate. The widths of the slots are greater for increased distance from the center. The combination of an angular dispersion plate and a radial dispersion plate act to efficiently distribute or collect independent flows into or out from the mixing disk 110. It will be recognized that the materials and dimensions of the plates 118 and 128, as well as the arrangement (including the number and dimensions) of the slots 132 and 134 in a plate may be different in other embodiments.

Figure 12:
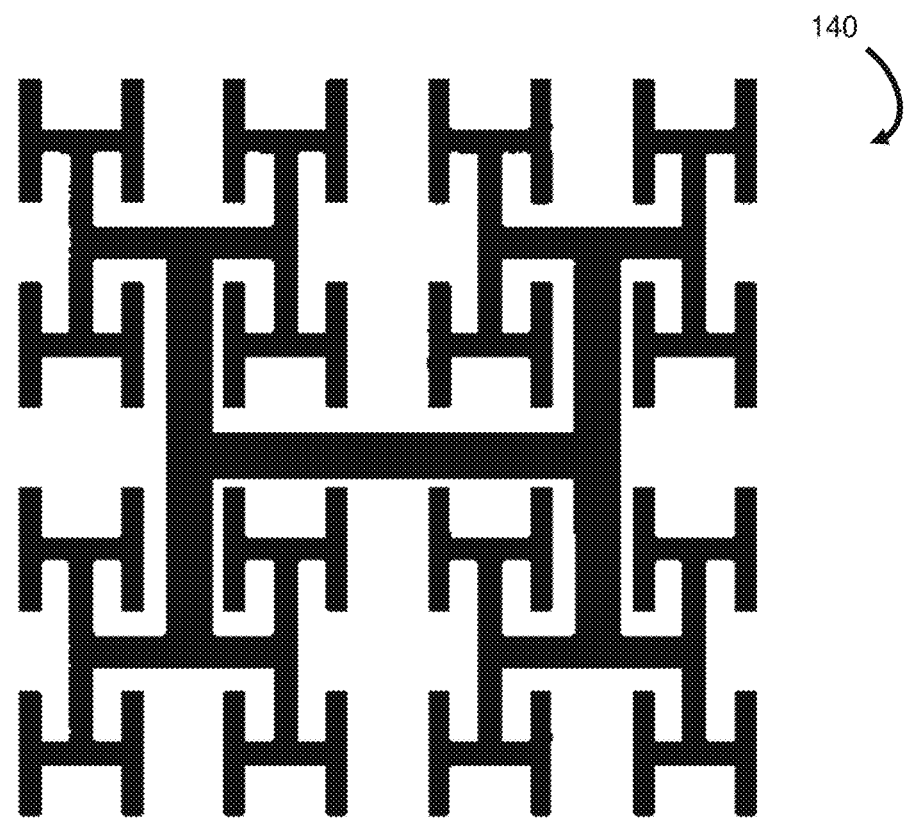
FIG. 12 is an example of a fractal flow distributor.
Figure 13:
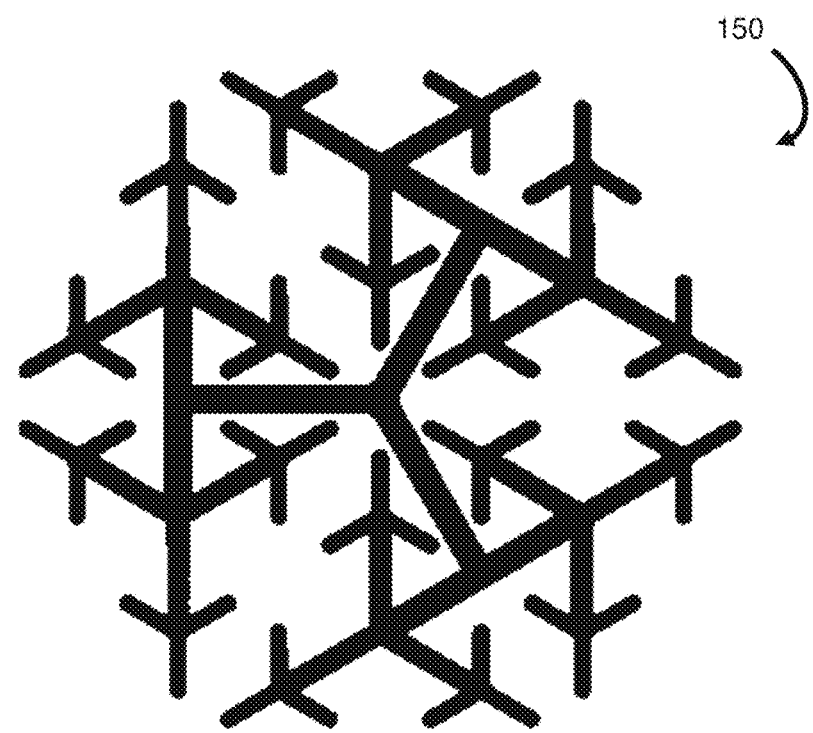
FIG. 13 is another example of a fractal flow distributor.

FIG. 12 is an example of a fractal flow distributor 140 that can be fabricated, for example, using a 3D-printing stereolithography process. The distributor 140 includes a central through hole that is split into two ramification channels each of which is again split into two ramification channels each of which is further split into another two ramification channels and so on. The splitting of channels occurs through the thickness of the distributor plate or disk to generate a fractal distribution of the flow over a surface. FIG. 13 is another example of a fractal flow distributor 150 that can be fabricated using a similar fabrication process. In this example, the distributor 150 includes a structure that splits into three ramification channels each of which is split and leads to three ramification channels each of which leads to another three ramification channels.

Figure 14:
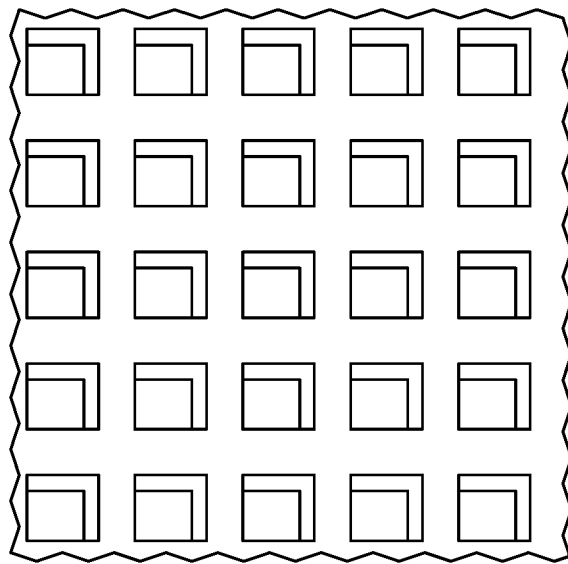
FIG. 14 shows a portion of an embodiment of a mixing disk.
Figure 15A:
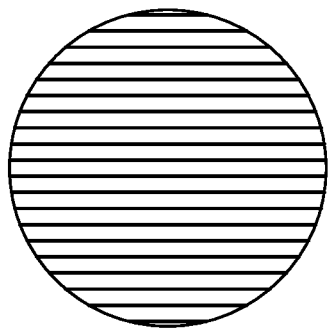
FIGS. 15A to 15D show photomasks that may be used in a three-dimensional fabrication process that includes sequential ultraviolet curing of a polymer material to build a mixing disk.
Figure 15B:
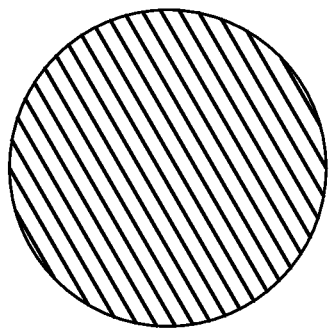
Figure 15C:
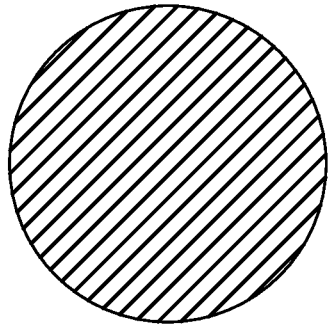
Figure 15D:
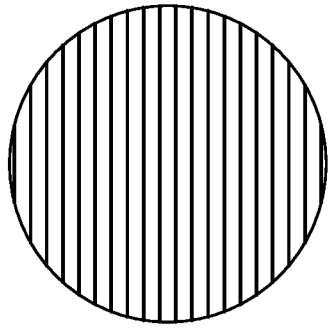

FIG. 14 is an example of a portion of a mixing disk 160 that can be made using a 3D fabrication process, such as stereolithography, with a polymer material. For example, use of the photomasks shown in FIG. 15A and FIG. 15D may be alternately used in a sequential UV cure of a polymer material to build square-like features of 50 μm on a side. First, straight channels are formed using the photomask shown in FIG. 15A then a square cross-section channel is formed using the photomask shown in FIG. 15D. The thickness of the resulting slice depends on the intensity of the UV light source, the concentration of a photo-initiator compound in the polymer material, monomer concentration and the UV exposure time. The curing process can be repeated multiple times with removal of unpolymerized material between cure cycles. In this way many layers can be stacked to fabricate various 3D structures by translating and/or rotating (e.g., see photomasks in FIGS. 15B and 15C) each slice relative to the other slices. This process is just one example of a fabrication technique for forming a mixing disk and it will be recognized that other fabrication techniques can also be used.

In various embodiments described above, the flow distributors and flow collectors are similarly constructed. For example, the structure of the flow distributor from the distributor inlet port to the distributor outlet port can be the same as the structure of the flow collector from the collector outlet port to the collector inlet port.

Figure 16B:
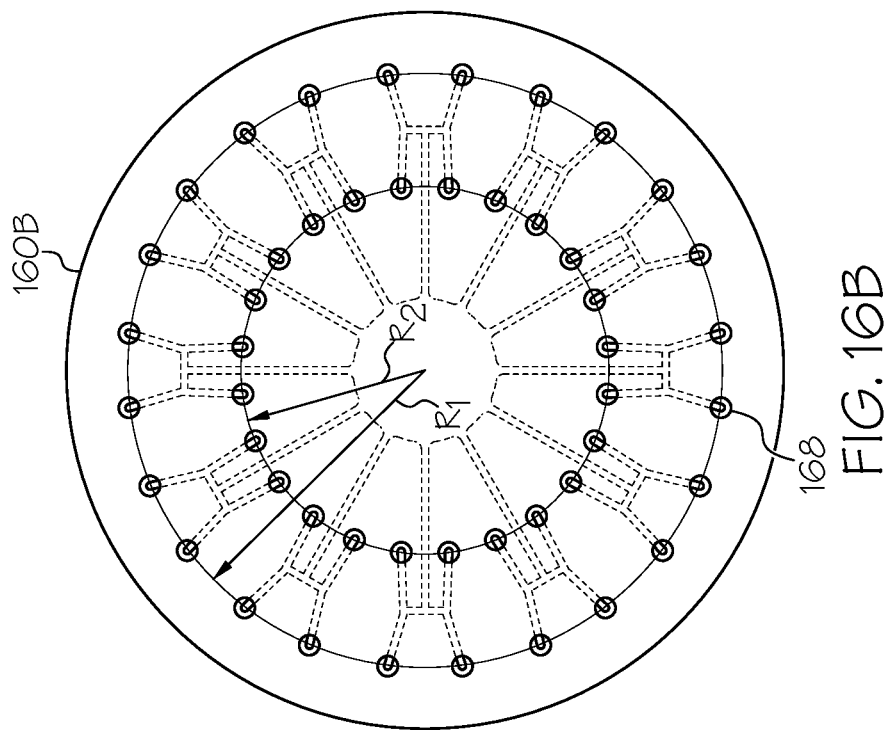
FIGS. 16A and 16B show surfaces of a flow distributor for an embodiment of a mixer.
Figure 16A:
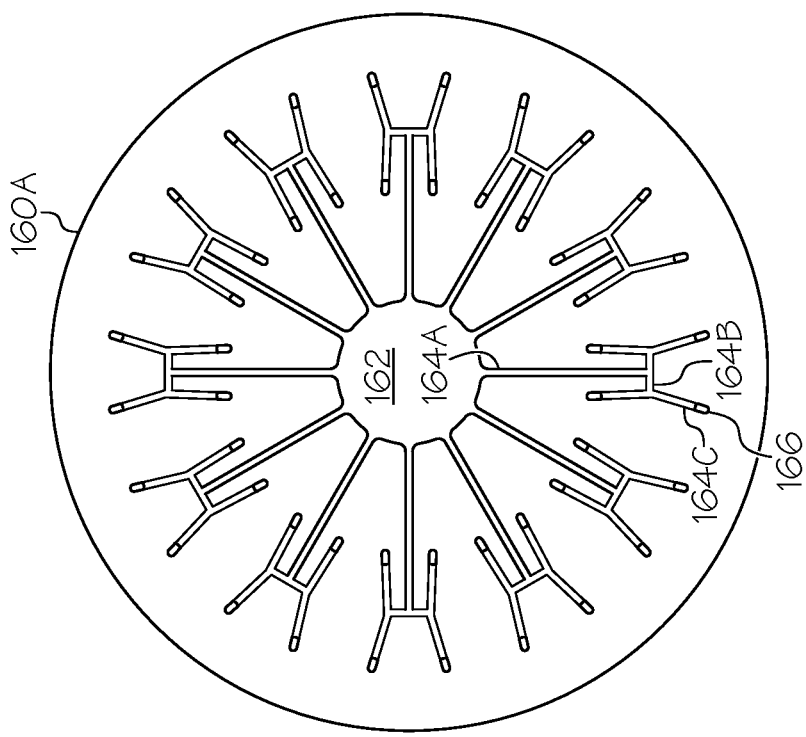

In one embodiment, a flow distributor is made of a single disk-shaped plate 160 having a first (upstream) surface 160A and a second (downstream) surface 160B as shown in FIGS. 16A and 16B, respectively. The first surface 160A shows a fractal distribution path structure. A series of fluidic paths start from an open circular central region 162 that receives the flow from the distributor inlet. First flow paths 164A extend at one end radially from the central region 162 to an opposite end at a midpoint of a second flow path 164B that is perpendicular to the first flow paths 164A. Each end of a second flow path 164B is near or at a midpoint of a third flow path 164C. As illustrated, there are 12 first flow paths 164A, 12 second flow paths 164B and 24 third flow paths 164C. At each end of each of the third flow paths 164C is an opening 166 at the downstream surface 160B.

The fluidic paths and other features of the flow distributor may be formed in a variety of ways. For example, known micro-machining techniques may be utilized. Alternatively, an etching process may be utilized to form the desired structure.

Each opening 166 is defined along one of two concentric circles of radius $R_1$ or $R_2$ with each circle being concentric with the mixer flow axis. Thus, a flow received at the distributor inlet port is internally separated into 12 flows, each of which is separated into four flows so that the number of flows exiting the second surface 160B is 48. The diameters of the openings 166 are preferably equal. In a non-limiting numerical example, the total area defined by all 48 openings is approximately five percent of the total surface area of the second surface 160B.

Figure 17:
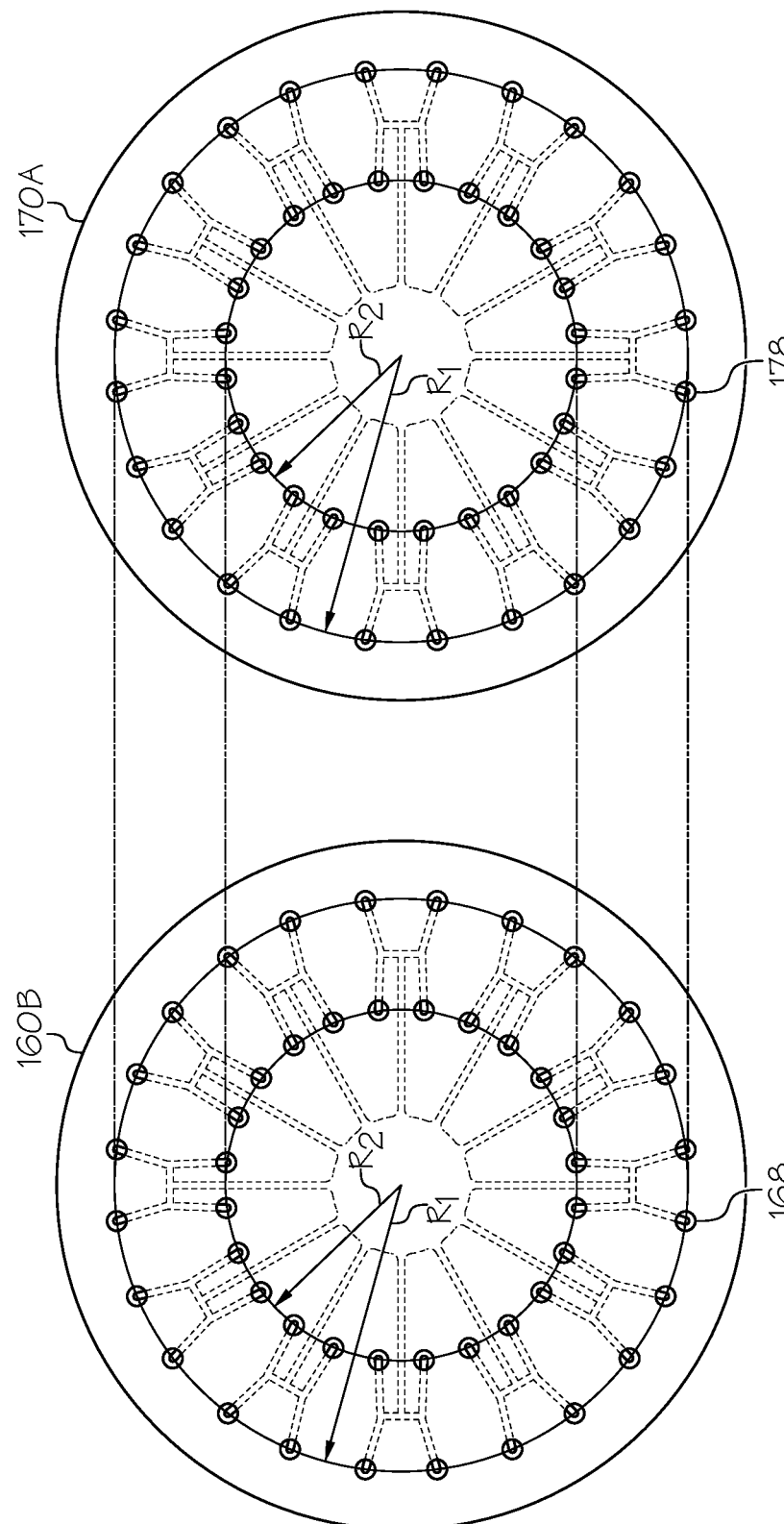
FIG. 17 depicts the spatial relationship between openings in a downstream surface of a flow distributor with respect to openings in an upstream surface of a flow collector in one embodiment of a disk mixer.

In one embodiment (Embodiment A), the flow distributor and flow collector are of identical construction, i.e., the mixer exhibits axial mirror symmetry about the mixing disk. In other words, the first surface 160A of the flow distributor is identical to the second surface of the flow collector and the second surface 160B of the flow distributor is identical to the first surface of the flow collector. The mixer is therefore configured such that the features of the flow collector are arranged in an inverse axial flow direction to those of the flow distributor but are otherwise the same. FIG. 17 illustrates the relationship between the openings 166 in the second (downstream) plate 160B of a flow distributor with respect to the openings 176 in a first (upstream) surface 170A of a flow collector in a mixer constructed in this manner. Each opening 166 and 176 is located on one of the two concentric circles of radius $R_1$ and $R_2$. The openings at the distributor outlet port are arranged identically to the openings at the collector inlet port. Thus, there is a one-to-one correspondence between each opening 166 in the second surface 160B of the flow distributor with a respective opening 176 in the first surface 170A of the flow collector. However, in other embodiments, the flow distributor and flow collector do not define a symmetrical arrangement about the mixing disk, as described further below.

Figure 18B:
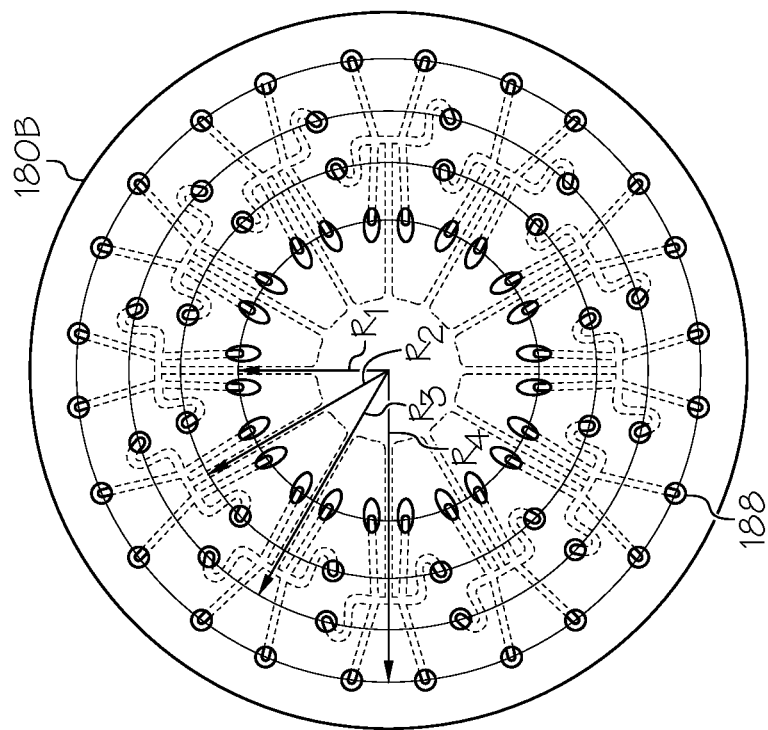
FIGS. 18A and 18B show the surfaces of a flow distributor for another embodiment of a mixer.
Figure 18A:
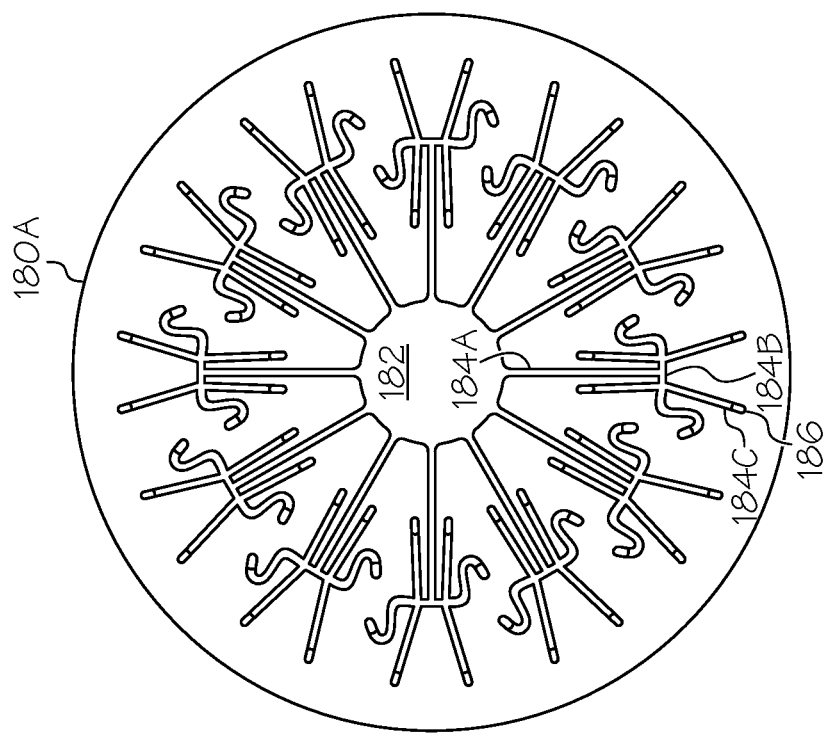

FIGS. 18A and 18B depict the upstream surface 180A and downstream surface 180B, respectively, used in a different implementation of a flow distributor. The first surface 180A shows a series of fluidic paths that start from an open circular central region 182 that receives the flow from the distributor inlet. First flow paths 184A extend at one end radially from the central region 182 to an opposite end at a midpoint of a short second flow path 184B arranged perpendicular to the first flow paths 184A. Each end of each second flow path 184B is coupled to one end of each three third flow paths 184C. As illustrated, there are 12 first flow paths 184A, 12 second flow paths 184B and 36 third flow paths 184C. At each end of each of the third flow paths 184C is an opening 186 at the downstream surface 180B.

Each opening 186 is defined along one of four concentric circles of radius $R_1'$, $R_2'$, $R_3'$ and $R_4'$, all of which are concentric with the mixer flow axis. A flow received at the distributor inlet port is separated into 12 flows, each of which is separated into two flows which are each further separated into three flows such that the number of flows exiting the second surface 180B is 72. Thus, the number of individual flows incident on the upstream surface of the mixing disk is greater than that for the embodiment illustrated in FIGS. 16A and 16B.

In one embodiment (Embodiment B) of a mixer, both the flow distributor and flow collector are formed as identical components each having 72 openings and are symmetrically arranged about the mixing disk.

Figure 19:
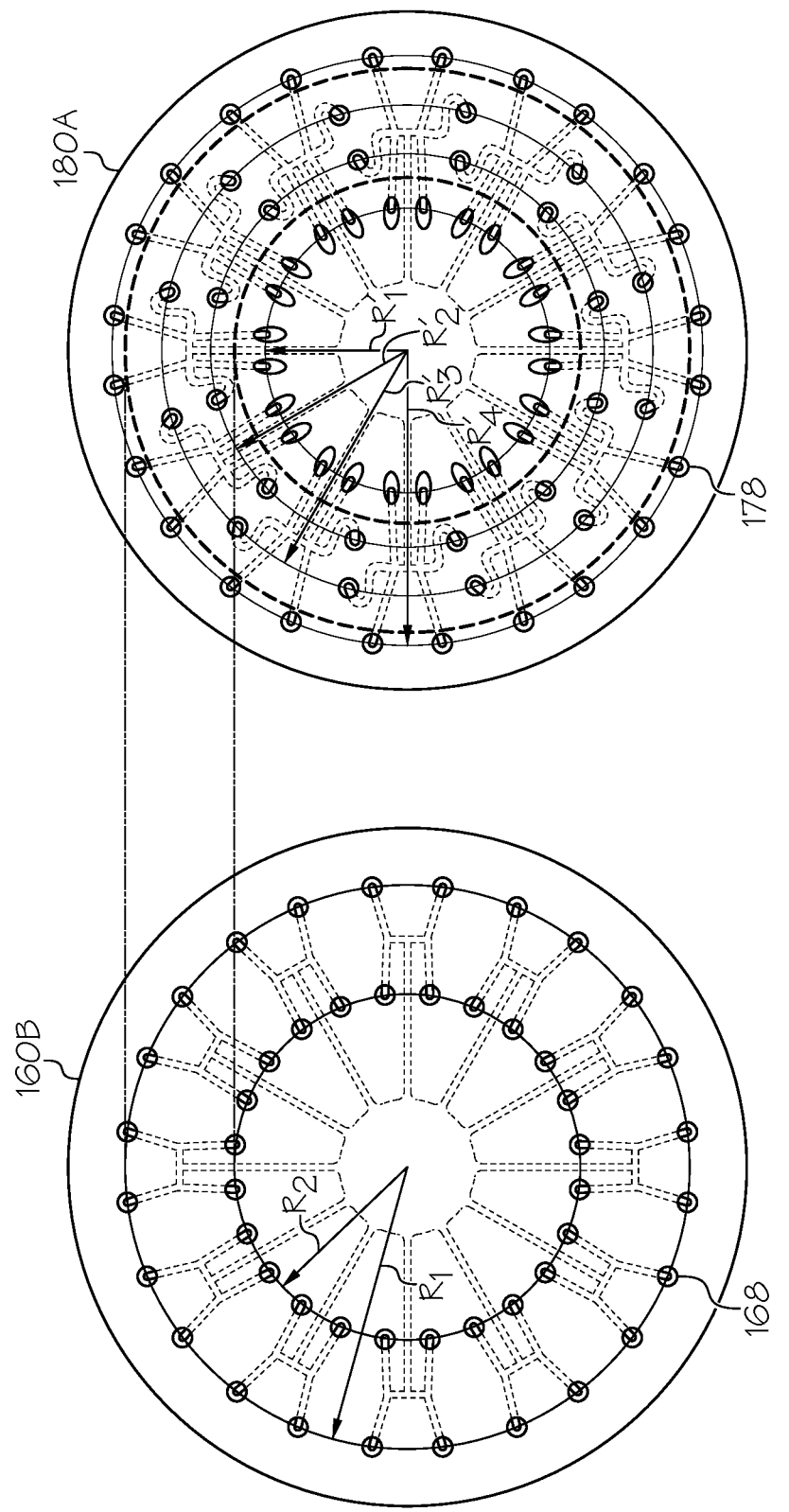
FIG. 19 depicts the spatial relationship between openings in a downstream surface of a flow distributor with respect to openings in an upstream surface of a flow collector in another embodiment of a mixer.

In another embodiment (Embodiment C), a mixer is constructed using a flow distributor as shown in FIGS. 16A and 16B and a flow collector as shown in FIGS. 18A and 18B. Thus, the flow distributor includes 48 openings 166 adjacent to the upstream side of the mixing disk while the flow collector includes 72 openings 186 at the downstream side of the mixing disk. FIG. 19 illustrates the relationship between the openings 166 in the second surface 160B of the flow distributor with respect to the openings 176 in the first (upstream) surface 180A of the flow collector in a mixer constructed in this manner. It can be seen that the concentric circles of radii $R_1$ and $R_2$ on which the openings 166 are defined are different from the concentric circles of radii $R_1'$, $R_2'$, $R_3'$ and $R_4'$ on which the openings 176 are defined.

In yet another embodiment (Embodiment D), a mixer is constructed using a flow distributor as shown in FIGS. 18A and 18B and a flow collector formed according to the structure shown in FIGS. 16A and 16B. In this arrangement, the flow distributor includes 72 openings 186 adjacent to the upstream side of the mixing disk and the flow collector includes 48 openings 166 at the downstream side of the mixing disk. As with Embodiment C, the concentric circles for the openings 166 and 176 are different.

An evaluation of performance was made using a pulse input of an analyte to determine the retention time distribution for mixers according to Embodiments A to D. Measurement results showed that Embodiment B has a higher peak and a marginally narrower width in its retention time distribution relative to that for Embodiment A. Embodiments C and D had nearly identical retention time distributions with peaks heights similar to that of Embodiment B; however, Embodiments C and D had retention time distributions with better symmetry.

It should be recognized that the number of internal flow paths and/or openings may be different from those described above. For instance, any flow splitting ramification having a number of fractal steps greater than two may be used. For example, two or more flow splitting disk elements may be stacked. Similarly, the arrangement of the internal flow paths and openings may be different. For example, the openings may be arranged on a different number of concentric circles. Other arrangements of openings are contemplated.

While the technology has been shown and described with reference to specific embodiments, it should be understood by those skilled in the art that various changes in form and detail may be made therein without departing from the scope of the claims.

What is claimed is:

1. A mixer for a liquid chromatography system comprising:
- a flow distributor having a distributor inlet port having a distributor inlet cross-section and a distributor outlet port having a distributor outlet cross-section which is greater than the distributor inlet cross-section, the distributor inlet port configured to receive a flow of a compositional solvent stream and the distributor outlet port configured to provide the compositional solvent stream distributed across the distributor outlet cross-section;
- a mixing disk having an inlet face, an outlet face and a plurality of channels each having an inlet end at the inlet face and an outlet end at the outlet face, the inlet face being in communication with the distributor outlet port, the channels having a flow direction anisotropy between the inlet and outlet faces; and
- a flow collector having a collector inlet port having a collector inlet cross-section and a collector outlet port having a collector outlet cross-section which is less than the collector inlet cross-section, the collector inlet port being in communication with the outlet face of the mixing disk to receive the flow of the compositional solvent stream after passing through the mixing disk.

2. The mixer of claim 1 wherein the mixing disk comprises a dispersive medium having a random porous structure.

3. The mixer of claim 1 wherein the channels have a tortuosity of at least five and no greater than ten.

4. The mixer of claim 1 wherein a retention time distribution of the mixer is dependent on a structure of the channels between the inlet face and the outlet face of the mixing disk.

5. The mixer of claim 1 wherein individual flows of the compositional solvent stream distributed across the distributor outlet cross-section have a diameter between approximately 100 µm to approximately 200 µm.

6. The mixer of claim 1 wherein an area of the distributor outlet cross-section is equal to a cross-sectional area of the inlet face of the mixing disk.

7. The mixer of claim 1 wherein an area of the collector inlet cross-section is equal to a cross-sectional area of the outlet face of the mixing disk.

8. The mixer of claim 1 where the mixing disk is formed of a material comprising one of a glass, a polymer and a metal.

9. The mixer of claim 1 wherein a void volume of the mixing disk is greater than a volume of the flow distributor and greater than a volume of the flow collector.

10. The mixer of claim 1 wherein the mixing disk comprises at least one mesh layer.

11. The mixer of claim 1 wherein the flow distributor comprises an angular dispersion plate.

12. The mixer of claim 1 wherein the flow distributor comprises a radial dispersion plate.

13. The mixer of claim 1 wherein the flow collector comprises an angular dispersion plate.

14. The mixer of claim 1 wherein the flow collector comprises a radial dispersion plate.

15. The mixer of claim 1 wherein the flow distributor is a fractal flow distributor.

16. The mixer of claim 1 wherein the flow collector is a fractal flow collector.

17. The mixer of claim 1 wherein the flow distributor comprises a plurality of openings at the distributor outlet port and a plurality of internal flow paths defined between the distributor inlet port and the distributor outlet port to conduct the compositional solvent stream to the distributor outlet ports.

18. The mixer of claim 17 wherein the openings are disposed along a plurality of concentric circles defined on the distributor outlet port.

19. The mixer of claim 17 wherein the flow collector comprises a plurality of openings at the collector inlet port and a plurality of internal flow paths defined between the collector inlet port and the collector outlet port to conduct the compositional stream from the mixing disk to the collector outlet port.

20. The mixer of claim 19 wherein the openings at the distributor outlet port are arranged identically to the openings at the collector inlet port.

21. The mixer of claim 19 wherein a number of openings at the distributor outlet port is different from a number of openings at the collector inlet port.

22. The mixer of claim 1 wherein the flow collector comprises a plurality of openings at the collector inlet port and a plurality of internal flow paths defined between the collector inlet port and the collector outlet port to conduct the compositional stream from the mixing disk to the collector outlet port.

23. The mixer of claim 22 wherein the openings are disposed along a plurality of concentric circles defined on the collector inlet port.

24. The mixer of claim 1 wherein the inlet face of the mixing disk has a cross-section that is substantially equal to the distributor outlet cross-section.

25. The mixer of claim 1 wherein the outlet face of the mixing disk has a cross-section that is substantially equal to the collector inlet cross-section.

* * * * *